United States Patent [19]
Sohma et al.

[11] Patent Number: 5,547,369
[45] Date of Patent: Aug. 20, 1996

[54] CAMERA, SPECTRUM ANALYSIS SYSTEM, AND COMBUSTION EVALUATION APPARATUS EMPLOYING THEM

[75] Inventors: Kenichi Sohma, Ibaraki-ken; Kazuyuki Itoh, Katsuta; Michio Kuroda; Tadayoshi Murakami, both of Hitachi, all of Japan

[73] Assignee: Hitachi, Ltd., Tokyo, Japan

[21] Appl. No.: 214,103

[22] Filed: Mar. 17, 1994

[30] Foreign Application Priority Data

Mar. 17, 1993 [JP] Japan .................................. 5-057418

[51] Int. Cl.$^6$ ........................................................ F23N 5/00
[52] U.S. Cl. ............................ 431/75; 431/18; 340/577; 340/578
[58] Field of Search ................................. 431/75, 18, 13, 431/17, 76–79; 340/577–578; 110/261–265

[56] References Cited

U.S. PATENT DOCUMENTS

| | | |
|---|---|---|
| 4,596,930 | 6/1986 | Stei et al. . |
| 4,756,684 | 7/1988 | Nishikawa et al. . |
| 4,913,647 | 4/1990 | Bonne et al. . |
| 5,133,605 | 7/1992 | Nakamura . |
| 5,269,289 | 12/1993 | Takehana et al. ........................ 128/4 |

FOREIGN PATENT DOCUMENTS

| | | |
|---|---|---|
| 148255 | 5/1981 | Denmark . |
| 1-28413 | 1/1989 | Japan . |
| 2-242013 | 9/1990 | Japan . |
| 3-78639 | 4/1991 | Japan . |
| 3-207912 | 9/1991 | Japan . |
| 4-315929 | 11/1991 | Japan . |
| 3-255813 | 11/1991 | Japan . |
| 4-31719 | 2/1992 | Japan . |

OTHER PUBLICATIONS

Patent Abstracts of Japan, vol. 11, No. 344 (M–640) (2791), Nov. 11, 1987, p. 33 M 640, & JP–A–62–123 218, T. Ichizo, "Monitoring Device for Furnace Inside".
Patent Abstracts of Japan, vol. 15, No. 481 (M–1187) (5009), Dec. 6, 1991, p. 154 M 1187, & JP–A–3–207–912, F. Kato, et al., "Flame Spectroscopic Image Display for Gas Turbine Combustion Device".
Patent Abstracts of Japan, vol. 16, No. 507 (M–1327) (5550), Oct. 20, 1992, p. 11 M 1327, & JP–A–4–186–014, F. Kato, et al., "Flame Spectral Diagnostic Device".

*Primary Examiner*—Larry Jones
*Attorney, Agent, or Firm*—Antonelli, Terry, Stout & Kraus

[57] ABSTRACT

A camera includes a plurality of photosensors disposed on an imaging surface. The photosensors separately output respective photodetection signals, and are grouped into a plurality of photosensitive units each including at least two of the photosensors. The photosensors of each of the photosensitive units have respective detection wavelength ranges which do not overlap one another. The photodetection signals outputted from selected ones of the photosensors of each of the photosensitive units are used in performing spectrum analysis. R (red), G (green), and B (blue) signals are synthesized from the photodetection signals outputted from the photosensors of each of the photosensitive units and are used in displaying an ordinary color image.

38 Claims, 17 Drawing Sheets

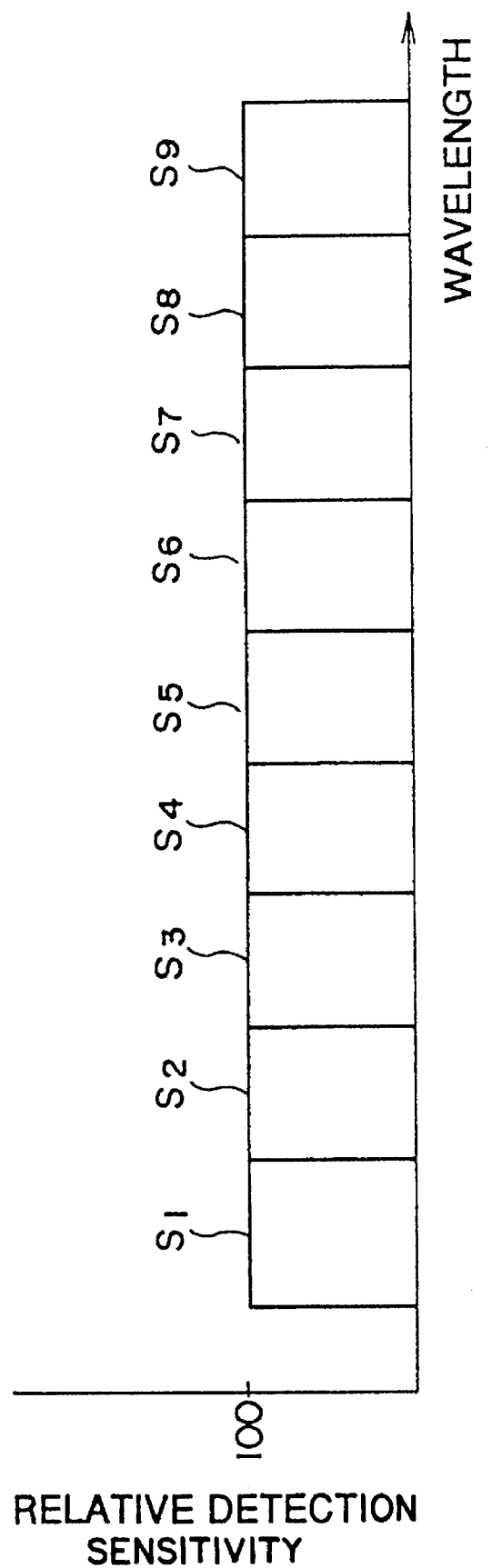

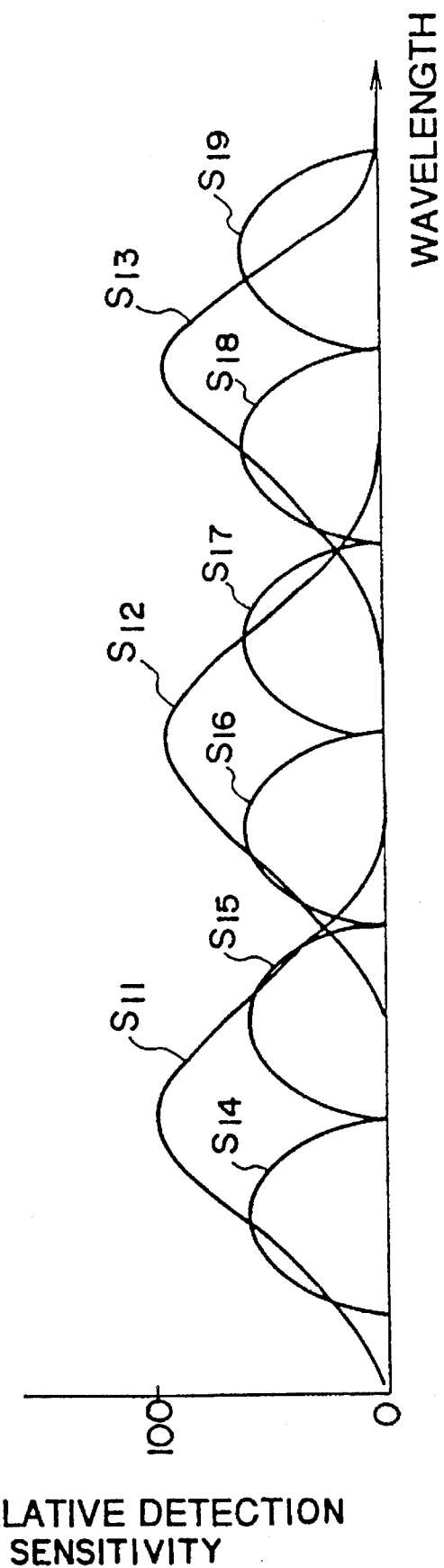

FIG. 14(a)    FIG. 14(b)    FIG. 14(c)
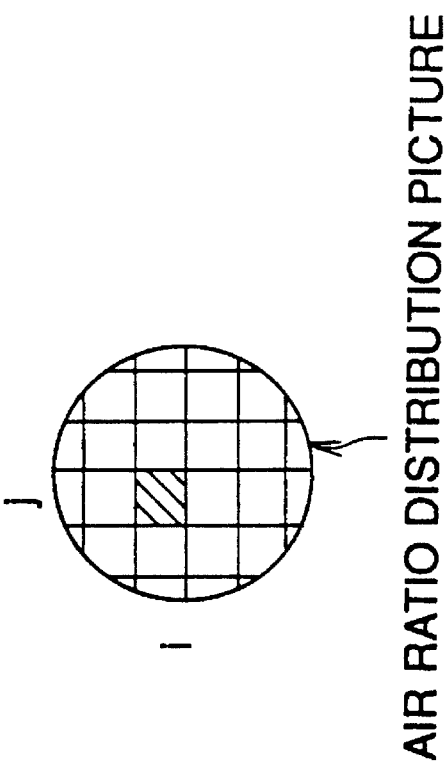
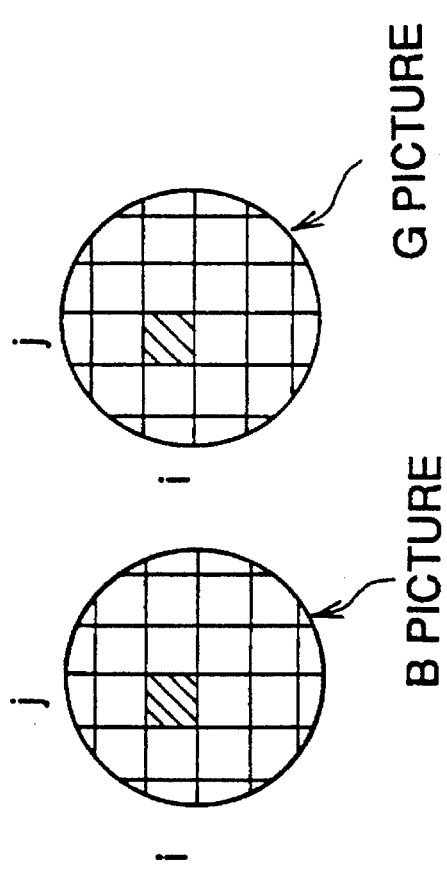
B PICTURE    G PICTURE    AIR RATIO DISTRIBUTION PICTURE

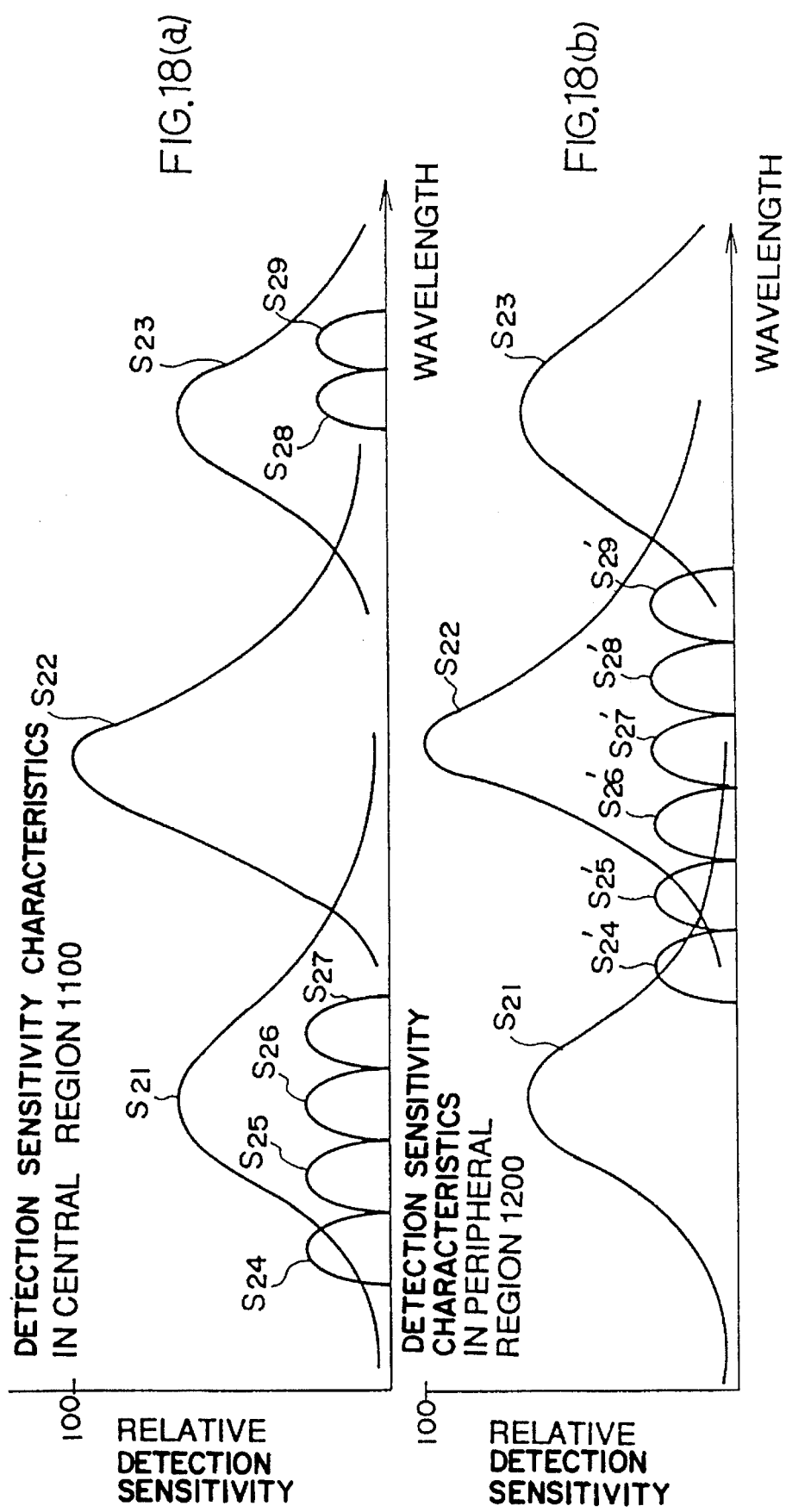

CAMERA, SPECTRUM ANALYSIS SYSTEM, AND COMBUSTION EVALUATION APPARATUS EMPLOYING THEM

BACKGROUND OF THE INVENTION

1. Field of the Invention

The present invention relates to a camera which can deliver both an ordinary color picture and spectrum analysis data, a spectrum analysis system, and a combustion evaluation apparatus which employs them.

2. Description of the Related Art

In a case where a camera employing a CCD (charge-coupled device) or the like is applied to spectrum analysis, only light of a desired wavelength is measured by externally mounting a filter on the camera. In the case of analyzing a spectrum at a plurality of wavelengths, or in the case of requiring an ordinary color picture, a plurality of filters and cameras are used.

An example in which the camera is actually used for spectrum analysis in this manner is a video system for analyzing the spectrum of flames in a gas turbine combustor as disclosed in Japanese Patent Application Laid-open No. 3-207912.

The prior art, however, has the following problem. In the case of changing between the plurality of filters in use, a mechanism for driving the filters is necessitated which incurs the problem of a complicated structure.

It has also been considered to use separate cameras for the respective filters. In this case, however, the operations of determining positions and angles for photographing, focusing the cameras, etc., must be performed in correspondence with the number of cameras in use. This poses the problem that a rapid measurement is impossible. Especially in the case of spectrum analysis, all the cameras need to be focused on an identical location, resulting in very difficult handling.

Another problem is that the system becomes costly.

SUMMARY OF THE INVENTION

The present invention has for its object to provide a camera which can, by itself, deliver an ordinary color picture and simultaneously deliver information for spectrum analysis, and a spectrum analysis system which employs the camera.

Another object of the present invention is to provide a combustion evaluation apparatus which employs the camera and the spectrum analysis system specified above.

In the first aspect of the present invention for accomplishing such objects, there is provided a camera comprising a plurality of photosensors which are disposed on an imaging face thereof, and which separately deliver respective photodetection signals; at least two of the plurality of photosensors in a predetermined combination being defined as one photosensitive unit, wherein the photosensors included in the one photosensitive unit have detection wavelength ranges which do not overlap each other.

Preferably, the photosensors constituting the one photosensitive unit are arranged adjacent to each other on the imaging face.

It is also preferable that a composite detection wavelength range of all the photosensors constituting the one photosensitive unit covers the whole visible radiation range.

In a camera for observing light of a certain specified wavelength, a photosensor which has a maximum detectivity at or near the specified wavelength should preferably be included in each of the photosensitive units.

It is preferable that at least one wavelength selected from the group of wavelengths consisting of emission wavelengths of a CH radical, a $C_2$ radical and an OH radical is the specified wavelength.

In the second aspect of the present invention, there is provided a spectrum analysis system comprising the camera defined in the first aspect of the present invention and separation means for separating only the signals of the desired photosensors from an output signal of the camera.

In the third aspect of the present invention, there is provided a spectrum analysis system comprising the camera defined in the first aspect of the present invention and synthesis means for synthesizing R (red), G (green) and B (blue) signals using an output signal from the camera.

In the fourth aspect of the present invention, there is provided a camera comprising a plurality of photosensors which are disposed on an imaging face thereof, and which separately deliver respective photodetection signals; the photosensors including at least one photosensor selected from the group of photosensors consisting of a first photosensor whose detection wavelength range includes an emission wavelength of a CH radical, but does not include emission wavelengths of a $C_2$ radical and an OH radical; a second photosensor whose detection wavelength range includes the emission wavelength of the $C_2$ radical, but does not include the emission wavelengths of the CH radical and the OH radical; and a third photosensor whose detection wavelength range includes the emission wavelength of the OH radical, but does not include the emission wavelengths of the CH radical and the $C_2$ radical.

In the fifth aspect of the present invention, there is provided a camera comprising a plurality of photosensors which are disposed on an imaging face thereof, and which separately deliver respective photodetection signals at least two adjacent ones of the plurality of photosensors being defined as one photosensitive unit; the one photosensitive unit including at least two photosensors selected from the group of photosensors consisting of a first photosensor whose detection wavelength range includes an emission wavelength of a CH radical, but does not include emission wavelengths of a $C_2$ radical and an OH radical; a second photosensor whose detection wavelength range includes the emission wavelength of the $C_2$ radical, but does not include the emission wavelengths of the CH radical and the OH radical; and a third photosensor whose detection wavelength range includes the emission wavelength of the OH radical, but does not include the emission wavelengths of the CH radical and the $C_2$ radical.

In the sixth aspect of the present invention, there is provided a spectrum analysis system comprising the camera defined in the fourth aspect of the present invention; and separation means for separating only the signals of the desired photosensors from an output signal of the camera.

In the seventh aspect of the present invention, there is provided a spectrum analysis system comprising the camera defined in the fourth aspect of the invention; and synthesis means for synthesizing R (red), G (green) and B (blue) signals using an output signal from the camera.

In the eighth aspect of the present invention, there is provided a camera comprising a plurality of photosensors, which separately deliver respective photodetection signals; at least two adjacent ones of the plurality of photosensors being defined as one photosensitive unit; the one photosensitive unit including photosensors for a color picture which exhibit sensitivity curves agreeing with those of ordinary color television, and photosensors for spectrum analysis whose detection wavelength ranges do not overlap one another.

In the ninth aspect of the present invention, there is provided a spectrum analysis system comprising the camera defined in the eighth aspect of the present invention and separation means for separating only the signals of the desired photosensors among the output signals derived from the photosensors for the spectrum analysis.

In the tenth aspect of the present invention, there is provided a combustion evaluation apparatus for evaluating a combustion state of flames, comprising a camera which photographs the flames; display means for displaying a picture of the frames by using an output signal from the camera; and arithmetic means for obtaining a physical quantity for evaluating a combustion property of the flames using the output signal from the camera.

In the eleventh aspect of the present invention, there is provided a combustion system comprising a burner which burns a mixture consisting of fuel and air; feed means for feeding the fuel and the air to the burner; adjustment means for adjusting a feed rate of at least one of the fuel and the air which are to be fed to the burner; a camera which photographs flames; display means for displaying a picture of the flames by using an output signal from the camera; arithmetic means for obtaining a physical quantity for evaluating a combustion property of the flames by using the output signal from the camera; and control means for controlling the adjustment means in accordance with the physical quantity obtained by the arithmetic means.

The first through the third aspects of the present invention will be explained below from operational viewpoints.

The output signals of the respective photosensors are separated by the separation means, whereby the intensities of light components in the certain detection wavelength ranges can be detected. On the other hand, the output signals of the respective photosensors are synthesized by the synthesis means, whereby the ordinary color picture can be obtained.

In the case of an application to the evaluation of the combustion state of flames, the emission intensity of the radical of an intermediate reaction product attendant upon combustion can be detected by selecting at least one of 310 [nm], 431 [nm] and 517 [nm] as the specified wavelength.

The fourth through the seventh aspects of the present invention will now be explained.

The first, second and third photosensors each detect only the emissions of the specified radicals, and they do not detect the emission of any other radical. Accordingly, when at least one of the first, second, and third photosensors is included, the combustion state of flames can be determined. Further, when of at least two of the first, second, and third photosensors are included, the photodetection signals of the camera can be used for processing such as taking the ratio of at least two signals.

The eighth and ninth aspects of the present invention will now be explained.

An ordinary color picture can be obtained by using the output signals from the photosensors for the color picture. On the other hand, information items in the desired detection wavelength ranges can be obtained by separating the output signals of the photosensors for the spectrum analysis with the separation means.

The tenth and eleventh aspects of the present invention will now be explained.

The combustion state of the flames can be monitored on the basis of the picture of the flames displayed on the display means, and the combustion state can be evaluated by using the physical quantity calculated by the arithmetic means. Further, the control means controls the adjustment means by using the physical quantity. Thus, the feed rate of the fuel and/or the air can be precisely adjusted.

BRIEF DESCRIPTION OF THE DRAWINGS

FIG. 4 is a graph showing the ideal relative detection sensitivity of the camera in the case where the camera of the present invention is more versatile;

FIG. 5 is a graph showing an example of the relative detection sensitivity of the camera in the case where photosensors for a color picture and photosensors for spectrum analysis are disposed completely separately;

FIGS. 14(a), 14(b) and 14(c) are diagrams for explaining a method of obtaining an air ratio distribution picture;

FIGS. 18(a) and 18(b) are graphical illustrations exemplifying relative detection sensitivity characteristics in the case of FIG. 17.

PREFERRED EMBODIMENTS OF THE INVENTION

A spectrum analysis system embodying the present invention will now be described.

The spectrum analysis system in this embodiment has the feature that a single camera can be used for observing a light component(s) of a desired wavelength(s) and simultaneously for obtaining an ordinary color picture.

Figure 1:
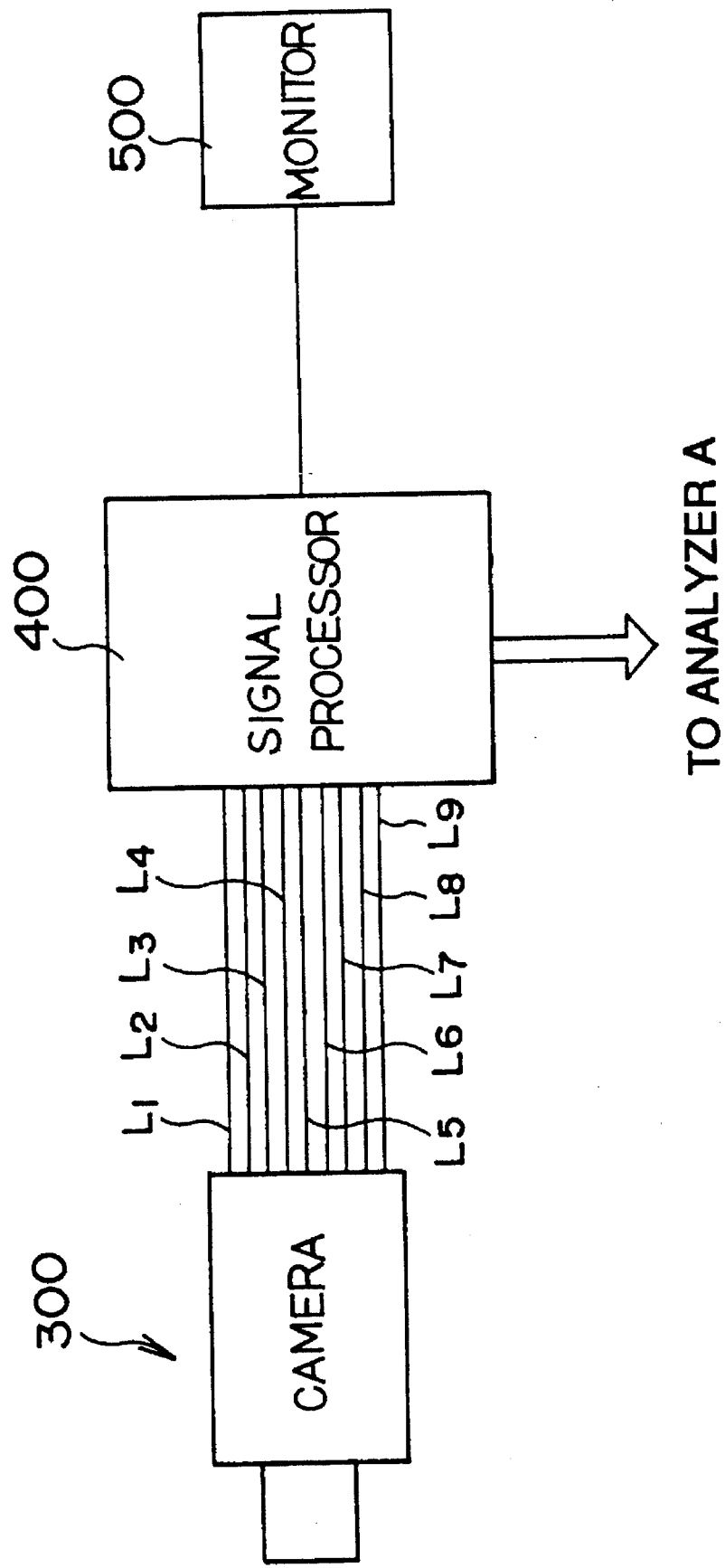
FIG. 1 is a block diagram showing the general construction of a spectrum analysis system according to the present invention.

As illustrated in FIG. 1, the spectrum analysis system includes a camera 300, a signal processor 400 and a monitor 500.

Figure 2:
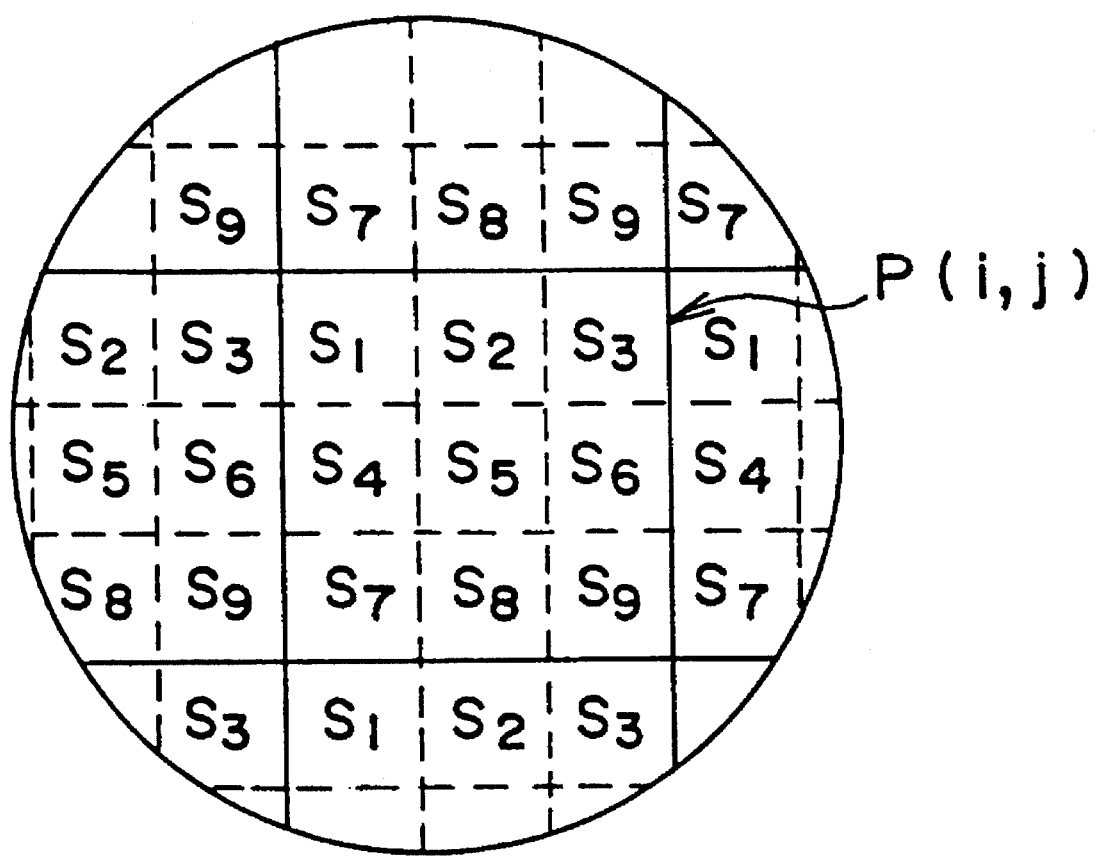
FIG. 2 is a schematic diagram showing photosensors which constitute one photosensitive unit in a CCD (charge-coupled device) section of a camera according to the present invention.
Figures 3A, 3B, 3C:
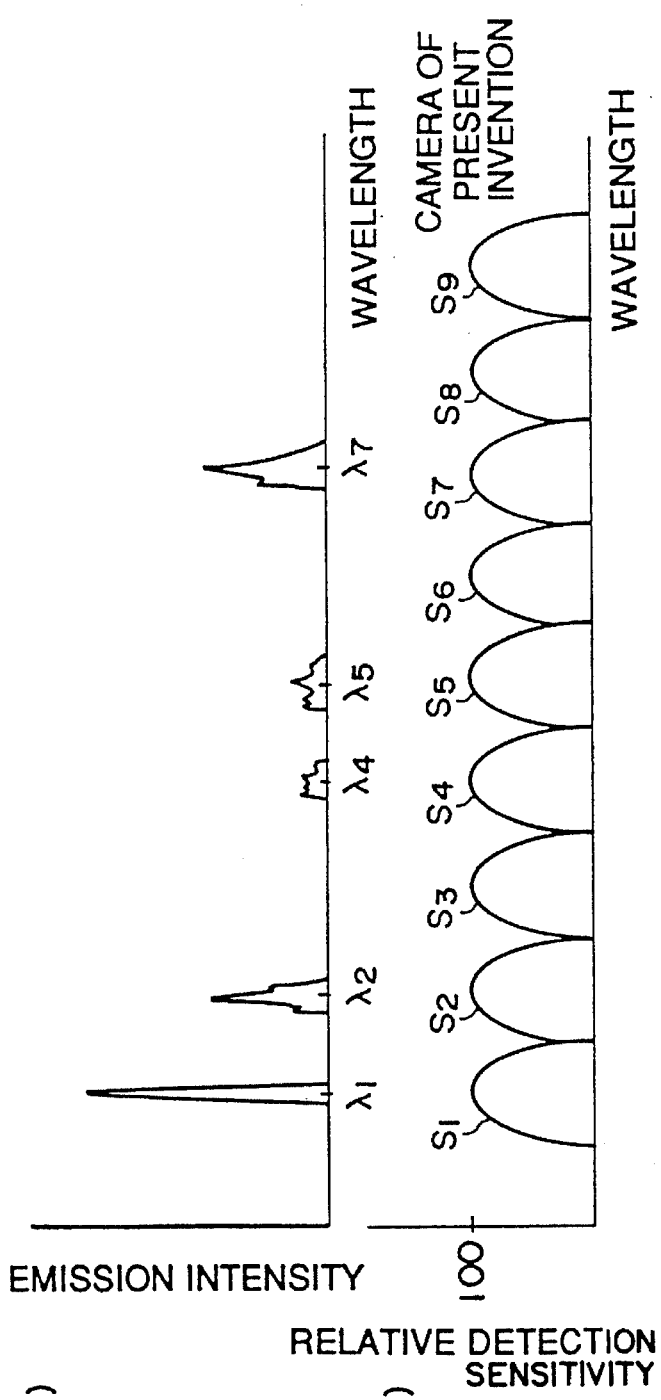
FIGS. 3(a) thru 3(c) are graphs for explaining the relative detection sensitivities of the camera of the present invention and a conventional camera.

A CCD (charge-coupled device) photosensor section of the camera 300 is shown on an enlarged scale in FIG. 2. The camera 300 has one photosensitive unit P(ijj) constituted by nine photosensors $S_1$–$S_9$. As illustrated in FIG. 3(b), the detection wavelength ranges of the photosensors $S_1$–$S_9$ substantially do not overlap one another. On the other hand, in a case where the detection wavelength ranges of the nine photosensors $S_1$–$S_9$ are collectively viewed, they cover substantially the whole visible radiation region. For comparison's sake, the outlines of the relative detection sensitivity curves of a conventional camera are illustrated in FIG. 3(c). As seen by comparing the graphs of FIGS. 3(b) and 3(c), the detection wavelength ranges of the photosensors $S_1$–$S_3$ lie within the detection wavelength range of a photosensor for blue light (B) in the conventional camera. The detection wavelength ranges of the photosensors $S_4$–$S_6$ lie within the detection wavelength range of a photosensor for green light (G) in the conventional camera. The detection wavelength ranges of the photosensors $S_7$–$S_9$ lie within the detection wavelength range of a photosensor for red light (R) in the conventional camera. The adjustments of such detection wavelength ranges can be made by altering the light transmission characteristics of a filter/filters which is/are disposed in the photosensor section. The light transmission characteristics can be altered by, for example, forming stacked filters having different characteristics or using unequal film thicknesses or different compositions for the individual filters.

Referring back to FIG. 1, the camera 300 is furnished with output signal lines $L_1$–$L_9$ which are provided in correspondence with the photosensors $S_1$–$S_9$. Thus, the detection signals of the respective photosensors $S_1$–$S_9$ can be delivered to the signal processor 400 independently of one another for every photosensitive unit. Needless to say, however, even when the nine output signal lines themselves are not independently led to the signal processor 400, the signal components of the photosensors may be output in a separable state. Since the arrangements of circuits, etc., for realizing such independent outputs are not, per se, especially restricted, they shall be omitted from the description here.

The signal processor 400 has functions such as synthesizing the output signals from the respective photosensors $S_1$–$S_9$ and arithmetically processing them as required. Also, this processor 400 has the function of supplying the monitor 500 or any other analyzer A with the output signals of the camera 300 directly or after the synthesis or arithmetic processing thereof. By the way, "separation means" or similar terms and "synthesis means" mentioned in the appended claims are implemented by the signal processor 400.

The monitor 500 is an ordinary color monitor (or a monochromatic monitor).

Next, let's consider a case where light having a spectral distribution as shown in FIG. 3(a) is observed by the use of the spectrum analysis system.

A light component of wavelength $\lambda_1$ is detected only by the photosensor $S_1$. A light component of wavelength $\lambda_2$ is detected only by the photosensor $S_2$. Light components of wavelengths $\lambda_4$, $\lambda_5$ and $\lambda_7$ are respectively detected only by the photosensors $S_4$, $S_5$ and $S_7$. The signal processor 400 supplies the analyzer A with only the signals of the photosensors for detecting the light components to be analyzed. By way of example, in the case of analyzing the light components of the wavelengths $\lambda_1$ and $\lambda_7$, the signal processor 400 delivers only the detection signals of the photosensors $S_1$ and $S_7$. Of course, in this case, the detection signal of the photosensor $S_1$ and that of the photosensor $S_7$ are sent in a state in which they can be subjected to separation, etc.

The analyzer A obtains information on the light components of the desired wavelengths by analyzing the signals sent from the signal processor 400. Incidentally, the analysis method is not restricted in any way. In this case, strictly speaking, the position from which the light component detected by the photosensor $S_1$ originated is different from that of the light component detected by the photosensor $S_7$. Since, however, all the photosensors $S_1$–$S_9$ are located in close proximity to each other, the signals detected by the respective photosensors may usually be handled as corresponding to light components which have originated from an identical position.

On the other hand, the signal processor 400 executes synthesis, etc. of the output signals for the monitor 500 in parallel with the delivery of the output signals to the analyzer A. The synthesis serves to obtain ordinary color picture. More specifically, the signal processor 400 synthesizes all the signals of the photosensors $S_1$–$S_3$ and delivers a synthesized signal corresponding to a B (blue) signal produced by a conventional camera. Also, it synthesizes the signals of the photosensors $S_4$–$S_6$ and delivers a synthesized signal corresponding to a G (green) signal produced by the conventional camera. Likewise, it synthesizes the signals of the photosensors $S_7$–$S_9$ and delivers a synthesized signal corresponding to an R (red) signal produced by the conventional camera. It is needless to say that, on this occasion, a picture having more natural colors can be obtained by applying appropriate weights to the signals of the respective photosensors in the synthesis. Further, a more natural color picture can be obtained in such a way that, in synthesizing the signals which correspond to the G signal by way of example, not only the signals of the photosensors $S_4$–$S_6$, but also those of the photosensors $S_2$, $S_3$, $S_7$ and $S_8$ for the peripheral wavelength regions of the detection sensitivity ranges of the photosensors $S_4$–$S_6$ are taken into consideration.

The maximum sensitivities of all the photosensors $S_1$–$S_9$ should preferably be equal. However, even when the maximum sensitivities are unequal, they can be corrected by signal processing. The overlaps of the detection wavelength ranges of the photosensors $S_1$–$S_9$ should preferably be as small as possible in order to facilitate the synthesis processing and to analyze the spectrum more accurately.

It is preferable for rendering the spectrum analysis system more versatile that the camera 300 has a detection sensitivity curve as shown in FIG. 4, in which the detection sensitivities of all the photosensors are flat and in which the valleys of the detection sensitivity curve between adjacent photosensors (parts where the detection sensitivity curve is low) are null, i.e. nonexistent. The reason therefor is that, in a case where the wavelength of the light component to be analyzed lies in the valley of the detection sensitivity curve, the detection sensitivity for the light component as required for the analysis becomes insufficient, so the spectrum analysis system is, in effect, inapplicable. On the other hand, for constructing a system which is dedicated to a specified use, it is preferable that the curves of the detection sensitivities of the individual photosensors form crests and that the wavelength of the maximum detection sensitivity is held in agreement with the wavelength of the desired light component (refer to FIGS. 3(a) and 3(b)). Needless to say, this is intended to detect the desired light component sensitively and to simultaneously minimize the detections of light components irrelevant to the analysis.

In general, narrowing the detection wavelength ranges of the individual photosensors realizes a measurement of higher versatility and higher precision. In this case, one photosensitive unit is constituted by a larger number of photosensors. It is also possible, in principle, to handle the whole frame (namely, the whole imaging face of the camera 300) as one photosensitive unit under the condition that the detection wavelength ranges of none of the photosensors overlap. Since, in general, a CCD (charge-coupled device) includes several hundred thousand photosensors, the detection wavelength range of each of the photosensors becomes very narrow. Accordingly, it is also possible to perform spectrum analysis at a wavelength resolution which is equivalent to that of a spectroscope employing a prism and a diffraction grating. The camera thus constructed can be regarded as a camera in which a prism is included. In this case, a mechanical driver is not needed for the spectral separation of light as is in the case of the prism, and the whole wavelength range can be measured at the same time. Therefore, the construction is especially effective from the aspects of a quick measurement, a high shock resistance and miniaturized equipment. The transmission characteristics of such minute regions can be respectively made different as stated before by forming photosensor section with stacked or multilayer filters, or by altering the film thickness or constituent material composition for the individual filters.

According to the above embodiment, in obtaining the ordinary color picture, the R, G and B signals are created by synthesizing the signals of the photosensors $S_1$~$S_9$. However, photosensors dedicated to the ordinary color picture may well be disposed to eliminate the need for such synthesis. By way of example, as illustrated in FIG. 5, among photosensors $S_{11}$~$S_{19}$ which constitute one photosensitive unit, photosensors $S_{11}$, $S_{12}$ and $S_{13}$ are respectively endowed with the same detection sensitivity curves as in the conventional camera. The detection wavelength ranges of the other photosensors $S_{14}$~$S_{19}$ are prevented from overlapping one another from the same viewpoint as in FIG. 3(b). Thus, the output signals of the photosensors $S_{11}$, $S_{12}$ and $S_{13}$ can be respectively handled as the R, G and B signals to obtain a more natural color picture. On the other hand, the signals of the photosensors $S_{14}$~$S_{19}$ are used for the spectrum analysis of light. According to this example, the obtainment of the more natural color picture and the accurate spectrum analysis of the light are made compatible. Herein, the detection wavelength ranges of the photosensors $S_{11}$~$S_{13}$ of one group overlap those of the other photosensors $S_{14}$~$S_{19}$ of the other group. Needless to say, however, no problem is posed because the signals of both the groups are separately utilized in accordance with the respective purposes (the generation of the color picture, and the spectrum analysis). This structure can also be applied to a monochromatic camera or a monochromatic image.

Figure 6:
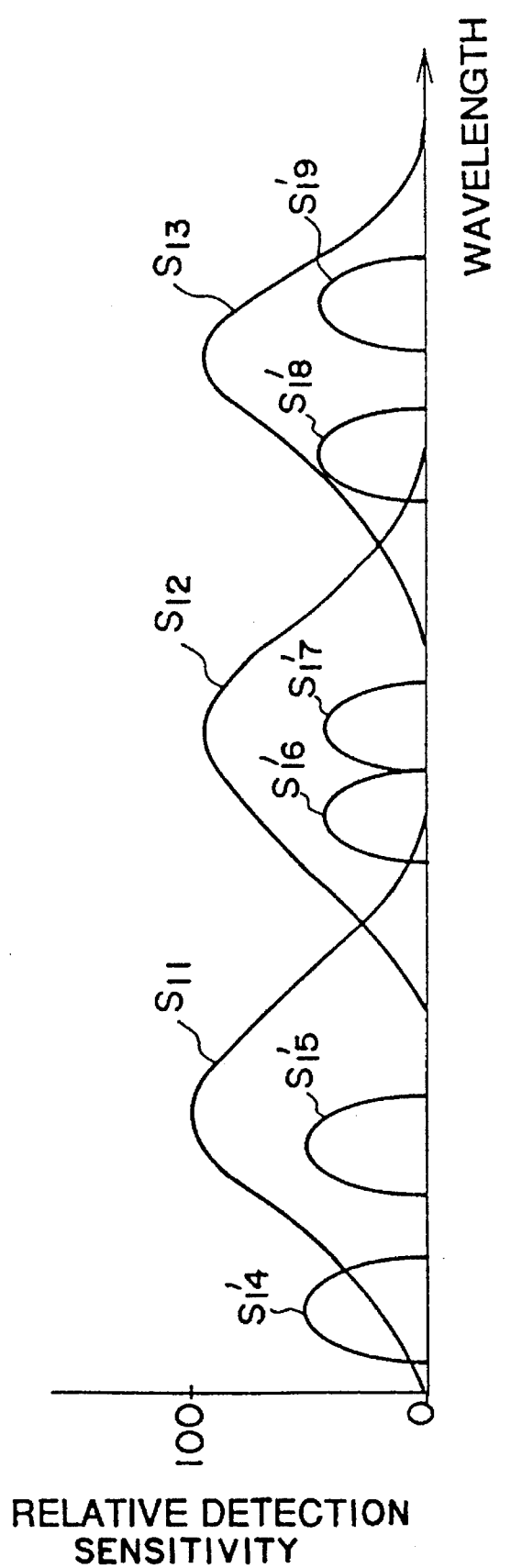
FIG. 6 is a graph showing another example of the relative detection sensitivity of the camera in the case where photosensors for a color picture and photosensors for spectrum analysis are disposed completely separately.

Although, in the example of FIG. 5 no valleys of detection sensitivity are formed over the whole detection wavelength range of the photosensors $S_{14}$~$S_{19}$ for the spectrum analysis, this measure is not always required in such a case where the wavelengths of light to be observed are specified beforehand. Since the photosensors for the spectrum analysis do not have their output signals utilized for the generation of the color picture, they may well be endowed with sensitivities only to necessary wavelength ranges, as are photosensors $S'_{14}$~$S'_{19}$ illustrated in FIG. 6.

As thus far described, the spectrum analysis system of this embodiment can offer both the spectrum analysis of high precision and the obtainment of the ordinary color picture equivalent to vision with the naked eye (or a picture in a desired color tone).

Figure 7:
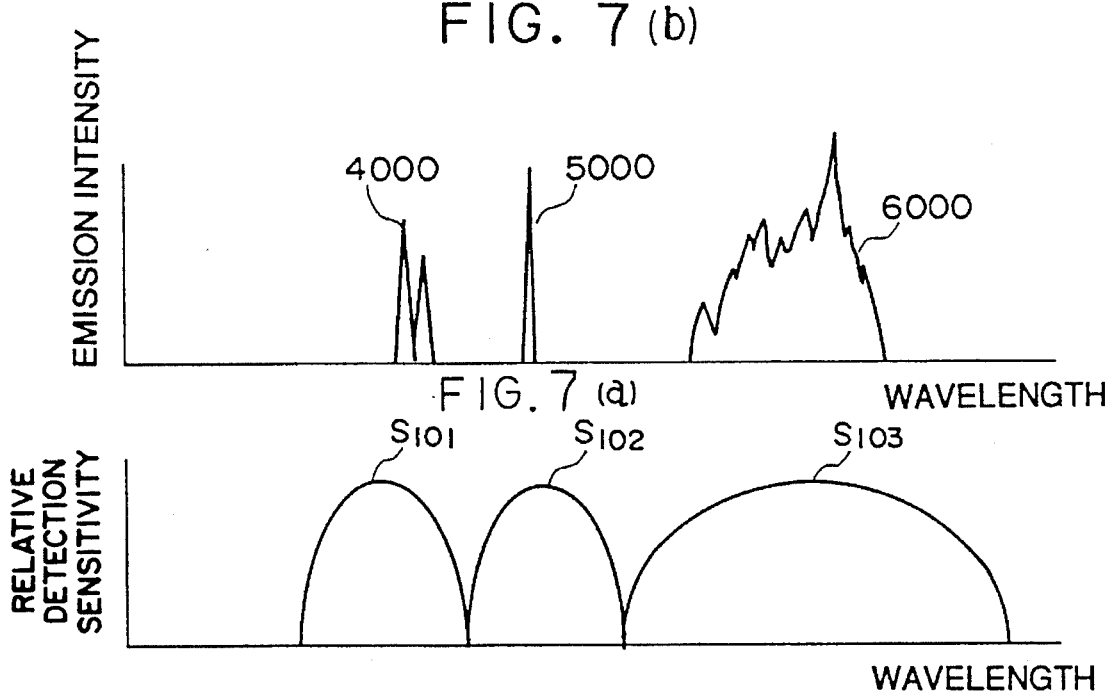
FIGS. 7(a) and 7(b) are graphical illustrations showing an example of the relative detection sensitivity of the camera in the case where the detection wavelength ranges of photosensors are changed.

It has been stated above that, in general, the measurement becomes more precise as the detection wavelength ranges of the photosensors are made narrower. However, in a case where a light component to be detected has a wide wavelength range, it does not hold true that the narrower detection wavelength ranges are better. Besides, the extents or widths of the detection wavelength ranges of the respective photosensors need not be equal. By way of example, in the case of a light component 6000 which has a comparatively extensive range of wavelengths as illustrated in FIG. 7(b), the detection wavelength range of a corresponding photosensor $S_{103}$ as illustrated in FIG. 7(a) may well be set wide in accordance with the extent of the wavelength range to be detected. In contrast, regarding a light component 5000 whose wavelength range is hardly extensive, the detection wavelength range of a corresponding photosensor $S_{102}$ may well be narrowed. In this case, however, a color picture having natural colors cannot be obtained by synthesizing the signals of photosensors $S_{101}$~$S_{103}$. It is therefore favorable to adopt the technique illustrated in FIG. 5 or FIG. 6.

Figure 8:
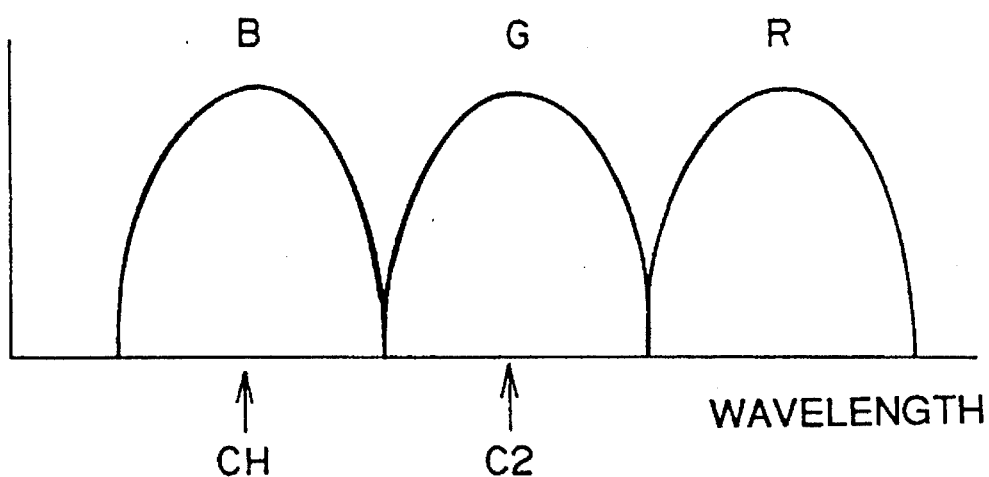
FIG. 8(a) is a graphical illustration showing a situation in the case where the spectrum analysis camera of the present invention is applied to a combustion system.
FIG. 8(b) is a graphical illustration showing a relationship between emission intensity ratio and air ratio.
Figure 8:
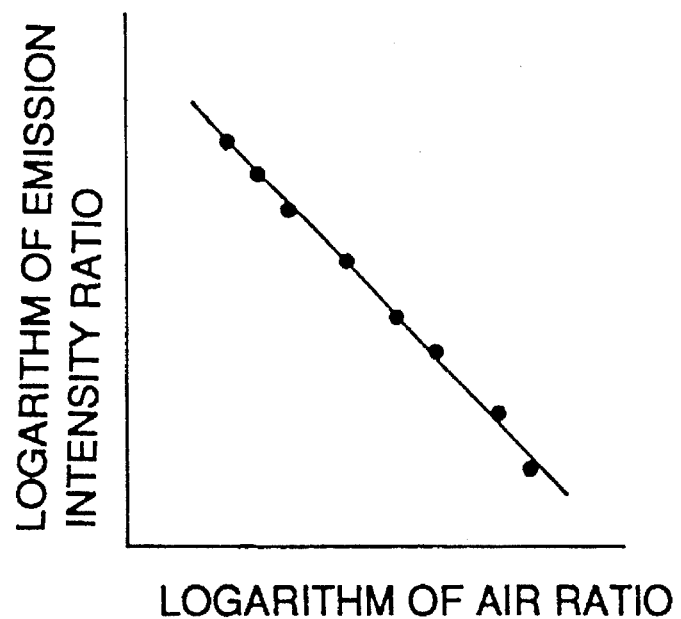

The camera employed in the spectrum analysis system is applicable to all spectrum analyses. By way of example, a camera 10 in an embodiment to be described below (a combustion system in FIGS. 9 et seq.) is one form of application of the camera in the foregoing embodiment. Although the camera 10 has one photosensitive unit constituted by three types of photosensors like the conventional camera, the respective photosensors thereof have detection wavelength ranges which hardly overlap unlike those of the conventional camera. In addition, wavelengths at which two of the types of photosensors exhibit maximum detection sensitivities (450 [nm] for B and 510 [nm] for G) are respectively brought into substantial agreement with the central wavelengths of light components to be measured (the light emission of a CH radical at 431 [nm] and that of a $C_2$ radical at 517 [nm]) (refer to FIG. 8(a)).

There will now be described the embodiment in which the spectrum analyzing camera of the present invention is applied to the combustion system.

Figure 9:
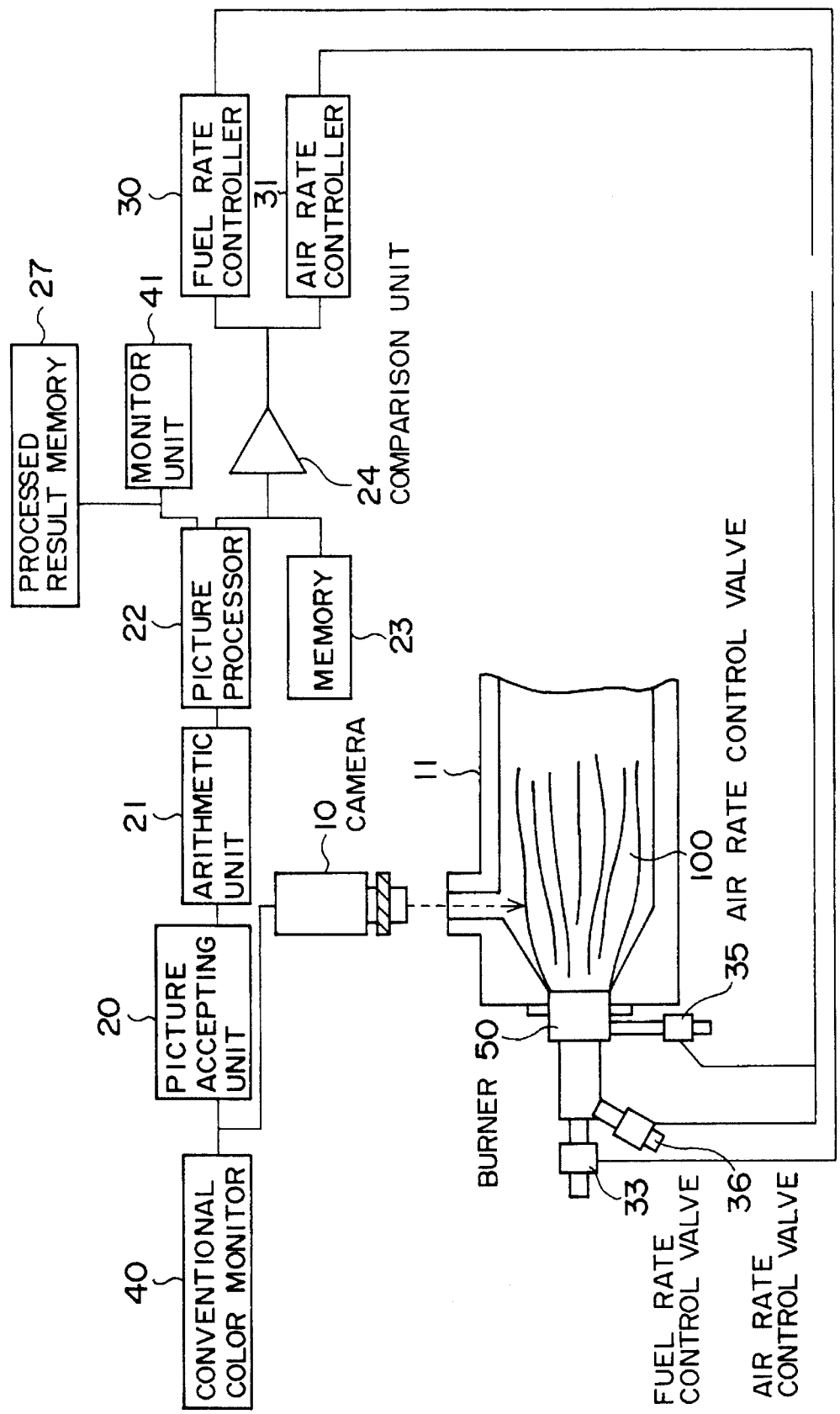
FIG. 9 is a schematic block diagram showing the general construction of the combustion system in an embodiment of the present invent ion.

The combustion system will be outlined with reference to FIG. 9.

In the combustion system of this embodiment, a combustor 11 is furnished with a burner 50 which produces flames 100. The light emission picture of the flames 100 formed by the burner 50 is taken by the camera 10. This camera 10 is a so-called "RGB electronic camera" which can deliver a red picture signal (R signal), a green picture signal (G signal) and a blue picture signal (B signal) both individually and independently as well as synthetically.

The R, G and B camera signals, i.e., the red picture signal (R signal), green picture signal (G signal) and blue picture signal (B signal), delivered from the camera 10 are synthesized, and the color picture of the flames 100 is delivered for monitoring to a conventional color monitor 40. Accordingly, the image of flames similar to the flames 100 observed by the naked eye is displayed on the screen of the color monitor 40. At the same time, the color picture is stored in a picture memory 42 shown in FIG. 10 as an original picture which is not processed yet. It is accordingly possible to play back the picture at some other time.

Also, the R, G and B camera signals produced by the camera 10 are sent to a picture accepting unit 20 and an arithmetic unit 21 in parallel with the delivery thereof to the color monitor 40. The arithmetic unit 21 executes, e.g., air ratio calculation processing for evaluating a combustion state by the use of the G and B signals. The air ratio calculation processing will be explained in detail later with reference to FIG. 13.

The signals processed by the arithmetic unit 21 are led to a picture processor 22. As to a physical quantity picture for evaluating, for example, the combustion state, the picture processor 22 executes pseudo color display processing, binarization processing for turning intensities into binary values with respect to any desired intensity, the calculations of areas and positions concerning a binarized picture, edge processing for connecting boundaries by lines, the calculations of the areas of regions enclosed by edges, the calculations of the lengths of the edges, the calculations of the average value and variance of the received light intensities of all pixels included in a measurement region, and so forth. Results obtained as the aforementioned feature quantities in relation to the input physical quantity picture are delivered to a comparison unit 24 and a unit 41 for monitoring a picture processing result.

The monitor unit 41 for the picture processing result displays a result obtained through the pseudo color display processing of the physical quantity picture serving chiefly to evaluate the combustion state, though it may well display the processed result image explained before. Accordingly, the monitor unit 41 and the color monitor 40 display images concerning the same flames 100, but the display picture of the former 41 becomes different from that of the latter 40 (refer to FIG. 10). Incidentally, a result processed by the picture accepting unit 20, arithmetic unit 21 and picture processor 22 is stored in a processed result memory 27 shown in FIG. 9 and can be utilized at some other time.

In the comparison unit 24, the feature quantity data of actual combustion flames actually received as an input are compared with the feature quantity data of ideal combustion flames stored in the memory 23 beforehand. In a case where the difference between the actual combustion flames and the ideal combustion flames is great, control signals for bringing both the combustion flames into agreement within any desired limits are respectively delivered to a fuel rate controller 30 and an air rate controller 31. In accordance with the corresponding control signals, the fuel rate controller 30 alters the opening degree of a fuel rate control valve 33 for feeding fuel into the combustor 11, and the air rate controller 31 alters the opening degrees of air rate control valves 35, 36 for feeding air into the combustor 11. By way of example, in a case where there is insufficient air, the air rate controller 31 increases the rate of the air to be fed. Thus, the optimum combustion state can be maintained at all times.

This embodiment has a construction for detecting the combustion state (that is, the camera 10, the arithmetic unit 21, etc.), as the most important feature thereof. Accordingly, the ensuing description shall be centered on this feature.

Figure 11:
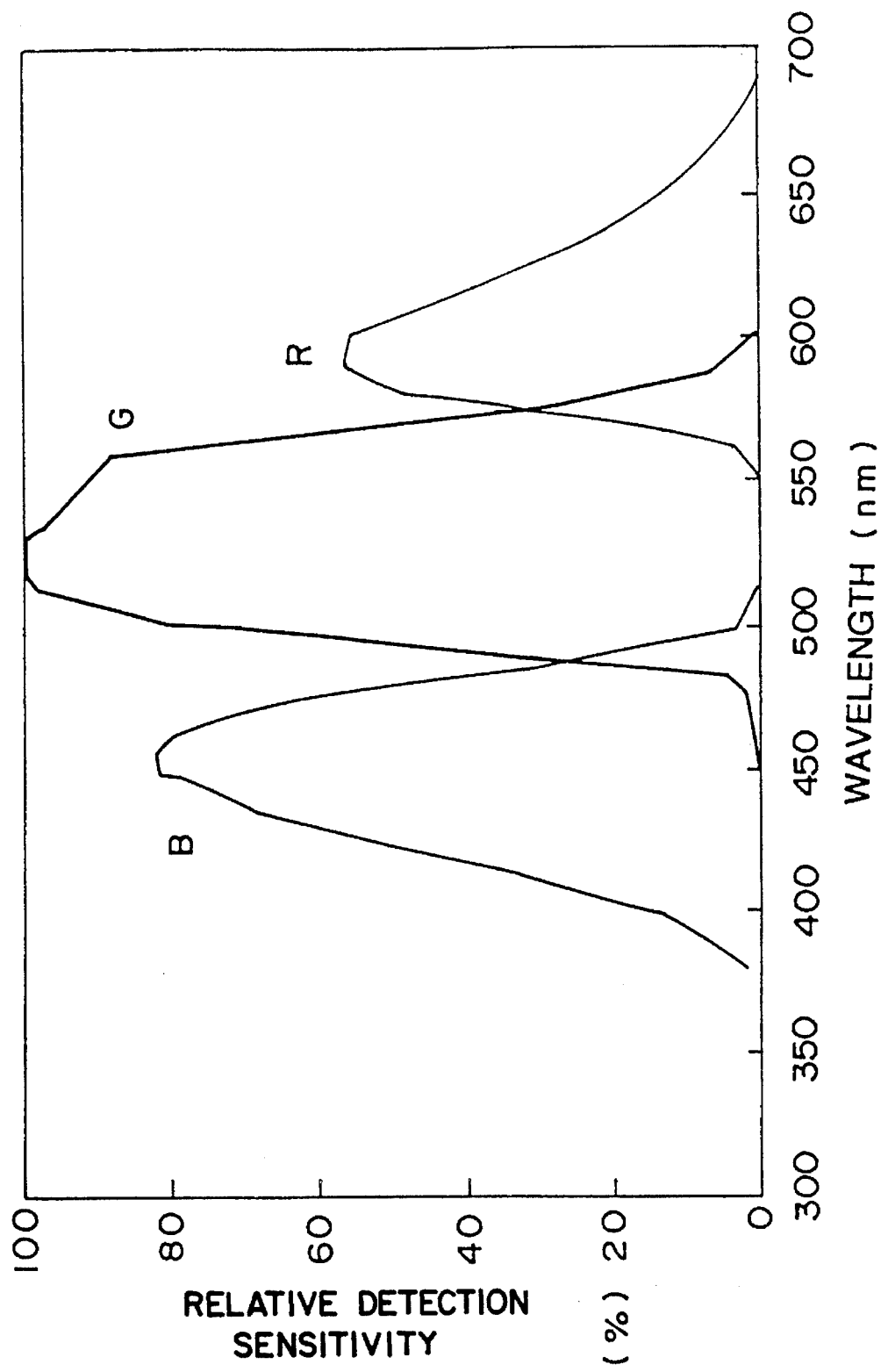
FIG. 11 is a graph showing the relative detection sensitivity of the camera in the embodiment of FIG. 9.

The camera 10 in this embodiment is the so-called "RGB electronic camera" which can deliver the red picture signal (R signal), the green picture signal (G signal) and the blue picture signal (B signal) both individually and independently as well as synthetically. As illustrated in FIG. 11, the relative detection sensitivity of the camera 10 has maximum sensitivities at 450 [nm] for blue (B), at 510 [nm] for green (G) and at 600 [nm] for red (R). Accordingly, as understood by superposing the relative detection sensitivity on the light emission spectrum of flames depicted in FIG. 12, a picture obtained as the blue picture signal (B signal) when the flames are photographed by the camera 10 corresponds mainly to the light of the CH radical, and a picture obtained as the green picture signal (G signal) corresponds mainly to the light of the $C_2$ radical. Each of the detection sensitivities is not very narrow, but somewhat wide. Accordingly, the photosensor for detecting blue by way of example has characteristics adapted to detect, not only the light component of the wavelength 450 [nm], but also light components near this wavelength to some extent. However, those components of the light of the flames which are other than the wavelengths shown in FIG. 11 are feeble and do not pose any problem in the analysis.

Further, when viewed as the whole photosensor section, the camera 10 in this embodiment can detect light over the whole visible radiation region.

Next, there will be explained the principles of that calculation of the air ratio of flames which is executed by the arithmetic unit 21.

The "air ratio" is defined as $Q_r/Q_t$. Here, the symbol $Q_r$ denotes the quantity of air which has been really or actually fed in order to burn a certain quantity of fuel fed. On the other hand, the symbol $Q_t$ denotes the theoretical quantity of air which is required for the perfect combustion of the certain quantity of fuel fed.

Figure 12:
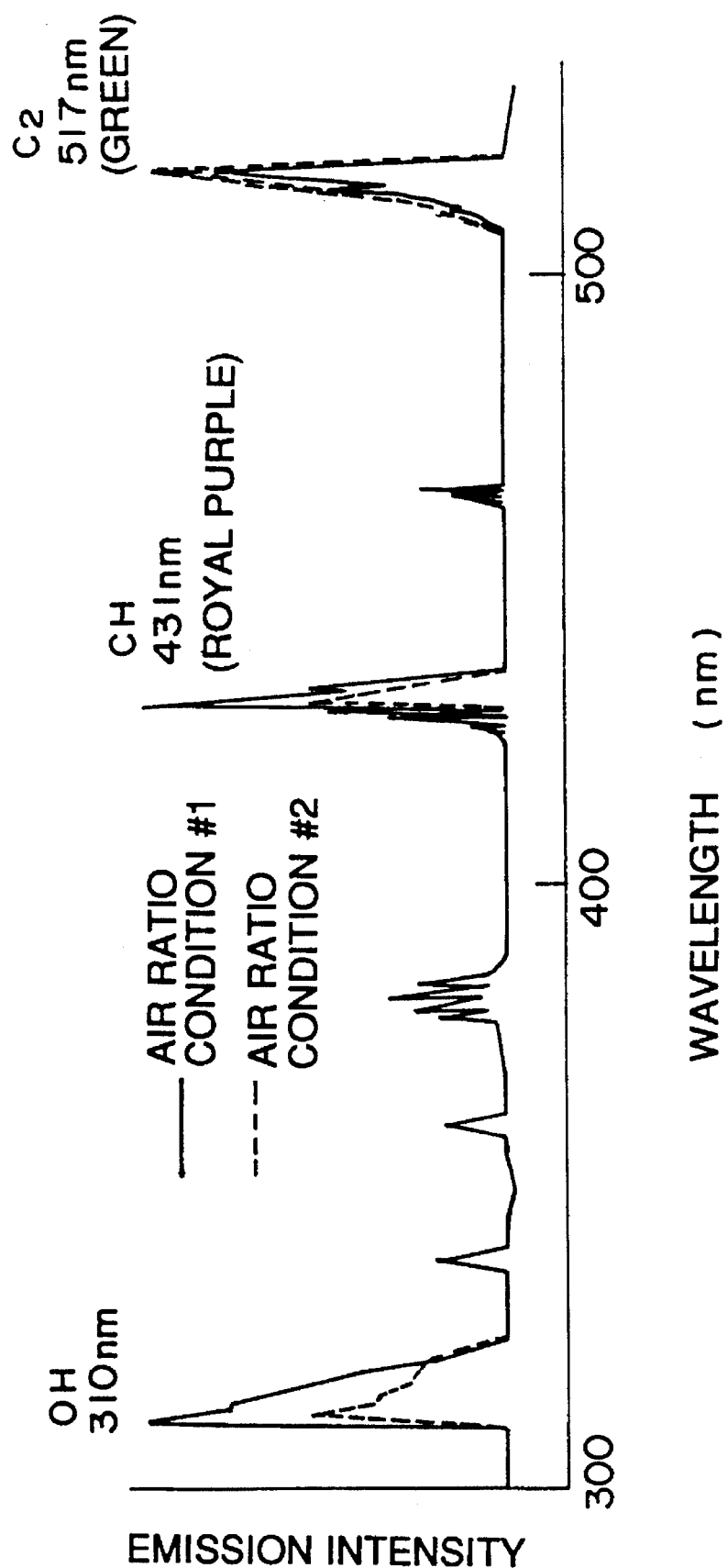
FIG. 12 is a graph showing the emission spectrum of flames.

Shown in FIG. 12 are those examples of the light emission spectrum of the flames (100 in FIG. 9) which were measured under different air ratio conditions. In the graph of FIG. 12, the air ratio condition #1 corresponds to a case where the air is excessive, and the air ratio condition #2 a case where the air is insufficient. It is understood from the graph that the intense emission light components of OH, CH and $C_2$ radicals which are intermediate reaction products (OH radical: 310 [nm], CH radical: 431 [nm] and $C_2$ radical: 517 [nm]) are observed, and that the intensities of the emission light components change in accordance with the air ratio conditions. Accordingly, when the relationship of the air ratio with the emission intensity of each radical is investigated beforehand, the air ratio can be known from the emission intensity of the radical (refer to FIG. 8(b)).

Figure 13:
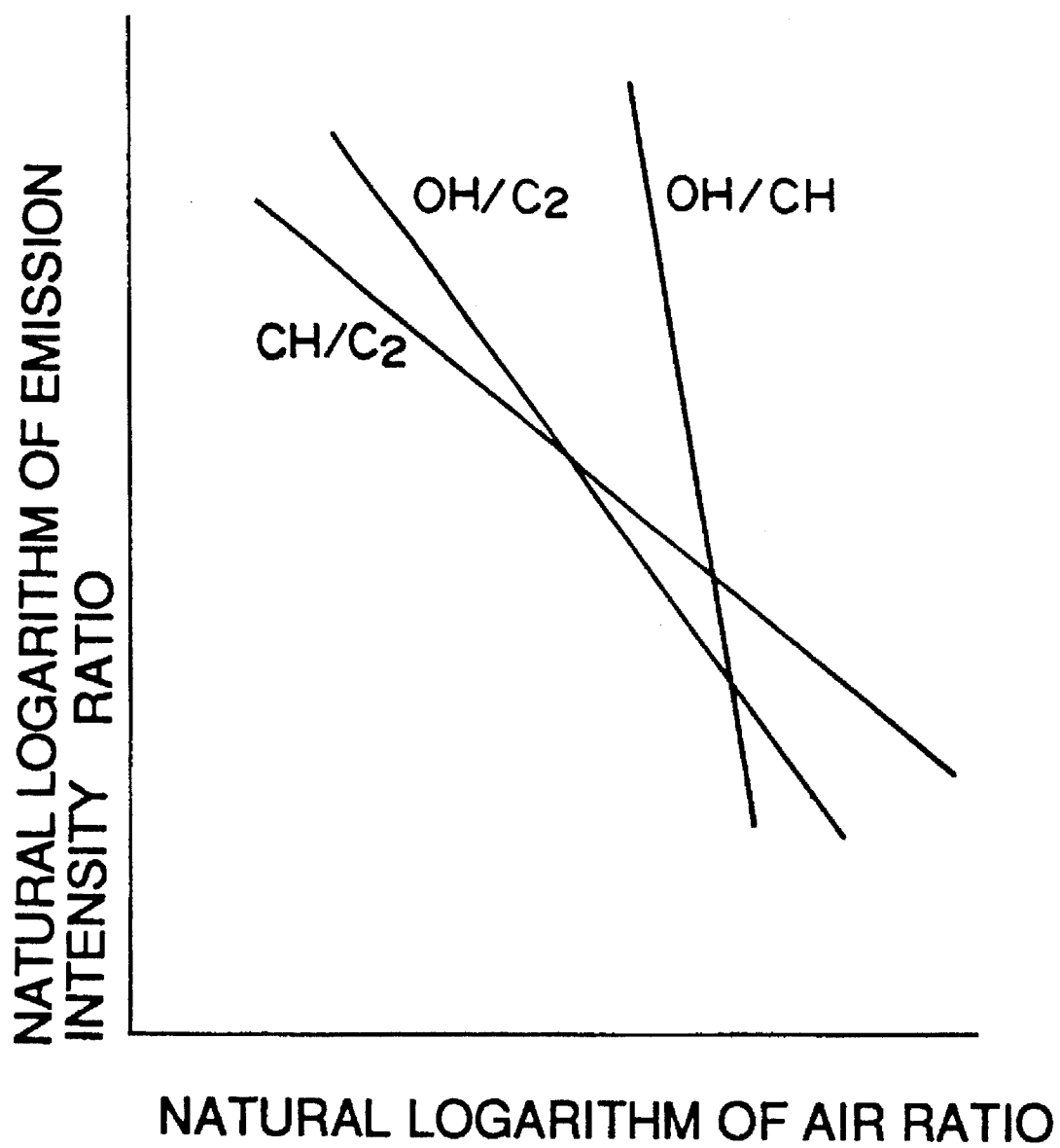
FIG. 13 is a graph showing the relationship between emission intensity ratio and air ratio for different radicals.

In this case, the measurement of the emission intensity of only one radical is sometimes incapable of distinguishing a low measured intensity value from the lowering of the emission intensity attributed to the dirt of a window or peep hole for observing the flames. The influence of the dirty window can be canceled by evaluating the ratio between the emission intensities of the respective radicals. Results obtained by investigating the relationships between the ratios of the emission intensities of the respective radicals and the air ratio are illustrated in FIG. 13. As is obvious from the graph of the figure, the air ratio of the flames can be determined by finding the emission intensity ratio. Incidentally, the OH radical emits ultraviolet radiation, which is usually attenuated in commercially available optical components which are made from glass materials other than quartz glass.

It is therefore practical that the light emissions of the CH radical and the $C_2$ radical lying within the visible radiation region are utilized as light components which are easy to handle, in other words, that the air ratio is evaluated by measuring the intensities of the light components of 431 [nm] and 517 [nm].

Figure 10:
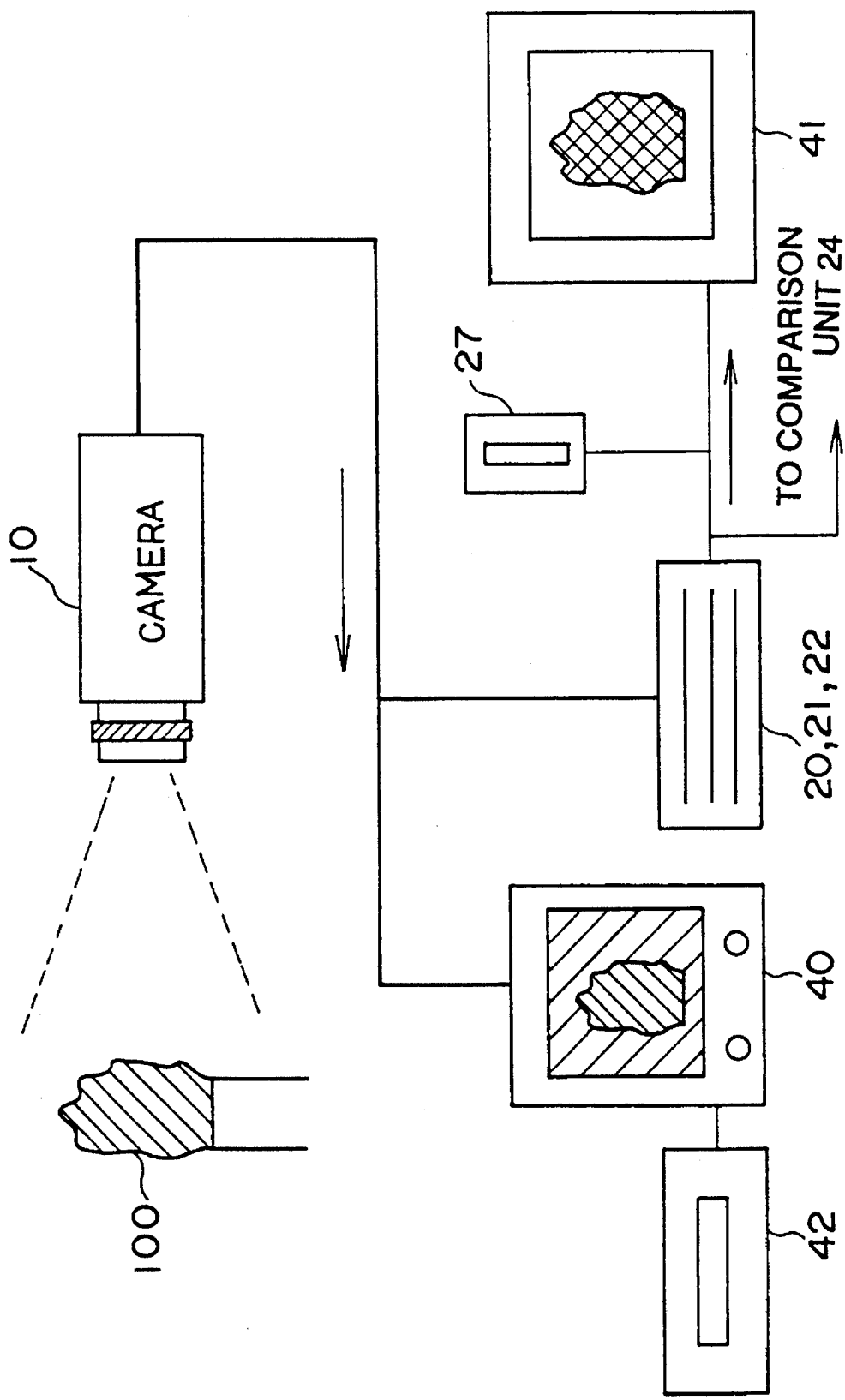
FIG. 10 is an explanatory diagram showing a light receiving system.

In the actual determination of the air ratio, the ratio between the emission intensities of the CH and $C_2$ radicals can be found by measuring the detection intensity ratio between the blue picture signal (B signal) and the green picture signal (G signal) which are delivered from the camera (10 in FIGS. 9 and 10). When the intensity ratio is calculated for every photosensitive unit (that is, between a blue pixel and a green pixel which belong to the identical photosensitive unit (i, j) on the frame of the image or the imaging face of the camera) and over the whole frame (or in a desired region), an air ratio distribution picture can be obtained (refer to FIGS. 14(a), 14(b) and 14(c)).

As stated above, according to the combustion system of this embodiment, a single camera can be used for monitoring the flames on the basis of the ordinary color picture and for obtaining the picture indicative of the distribution of the air ratio values. Moreover, the air ratio distribution picture can be obtained in a short time period, and it has a high accuracy. Besides, the system can be operated with ease. It is accordingly possible to provide the combustion system which can control the fuel and air rates more precisely, which is favorable for the protection of the environment and which has a high combustion efficiency. In addition, since a single camera is used, a camera focusing operation is easy.

The camera 10 in this embodiment is directly and extensively usable for measuring the combustion states of flames. In this case, as regards the fuel from which the flames are produced, the camera 10 is applicable to various kinds of liquid fuel and gaseous fuel such as natural gas and heavy oil. The reason therefor is that all of these kinds of fuel contain elements C, H, etc., and have light emissions of the CH radical, etc., in their flames. However, even when the element C is contained, solid fuel such as coal emits radiant heat besides the radical emission light during its combustion. Therefore, another counter measure is needed for the camera to be applicable. It is needless to say that the camera 10 can be used for the evaluation of all the other combustion states by altering the sensitivity curves of the photosensors thereof.

Another embodiment will be described.

The combustion system of this embodiment has the feature that the combustion properties of a plurality of burners are evaluated and controlled on the basis of a single camera.

Figure 15:
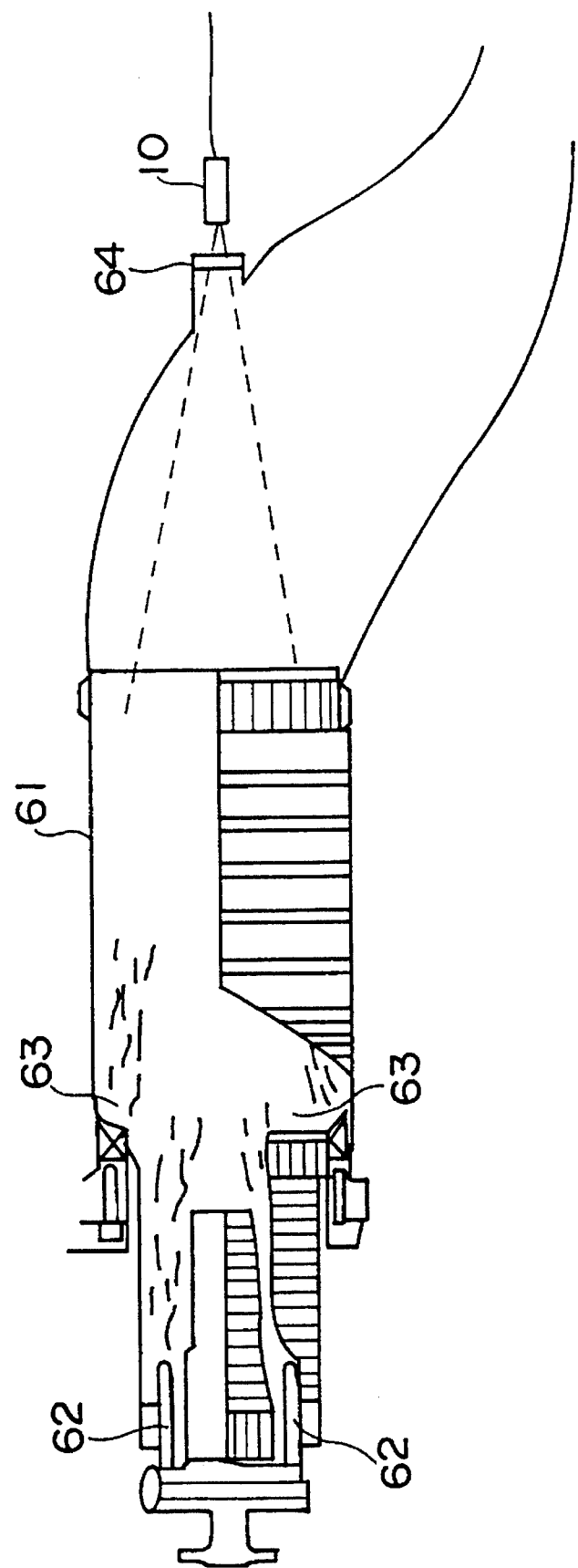
FIG. 15 is a side view, partly in section, showing the combustion system in another embodiment of the present invention.

A combustor 61 in the combustion system is illustrated in FIG. 15. By the way, the constituents of this embodiment not shown in the figure (for example, the color monitor 40, the arithmetic unit 21 and the monitor 41) are fundamentally the same as in the preceding embodiment illustrated in FIGS. 9 and 10.

Figure 16:
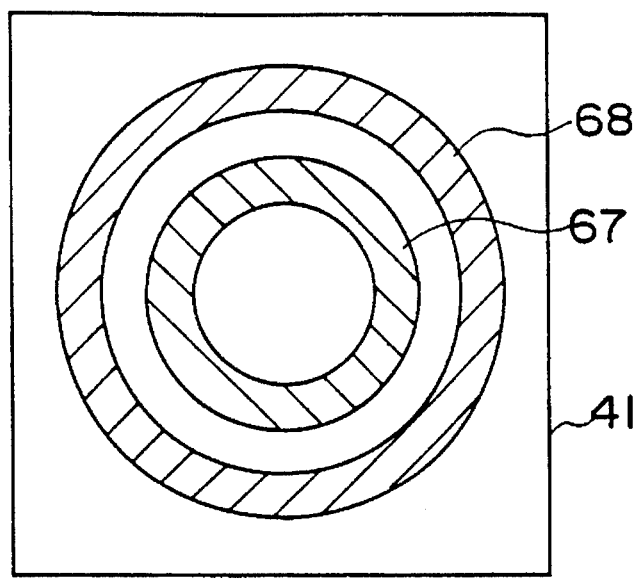
FIG. 16 is a diagram showing a monitor screen on which a picture taken for the example of FIG. 15 is displayed.

The combustor 61 is a gas turbine combustor, which includes a group of inner burners 62 and a group of outer burners 63. Among results observed through an observation window or peep hole 64, an air ratio distribution picture is displayed on the screen of the monitor unit 41, and the whole air ratio distributions of flame zones formed by the group of inner burners 62 and the group of outer burners 63 can be simultaneously measured. Accordingly, this embodiment has the effect that the combustion states of the plurality of burners can be evaluated and managed at the same time. It is desirable that the flame zone 67 formed by the group of inner burners 62 and the flame zone 68 formed by the group of outer burners 63 have uniform air ratios as illustrated in FIG. 16, respectively. In some cases, however, the air ratio distribution of at least either of the flame zones 67 and 68 becomes nonuniform for some reason. According to this embodiment, it is possible to identify the fact that a nonuniform air ratio distribution has arisen, and to specify the place of the nonuniform distribution. Herein, it is needless to say that, in evaluating the combustion states of the group of inner burners 62, judgement is passed using only the data of a region where the flame zone 67 is projected on the monitor screen (refer to FIG. 16). Likewise, it is needless to say that, in evaluating the combustion states of the group of outer burners 63, judgement is passed in view of only a region where the flame zone 68 is projected on the monitor screen (refer to FIG. 16). Accordingly, the adjustments of a fuel rate and an air rate, etc., can be done in order to eliminate the nonuniformity in the air ratio distribution. On the other hand, in a case where the cause of the nonuniformity concerns the structure of the combustor itself, a portion to be remodeled is revealed. The uniform combustion of the flames leads to an enhanced combustion efficiency, and can decrease the p.p.m. (parts per million) of nitrogen oxides in an exhaust gas. Therefore, the measurement of the air ratio distributions is very effective.

Figure 17:
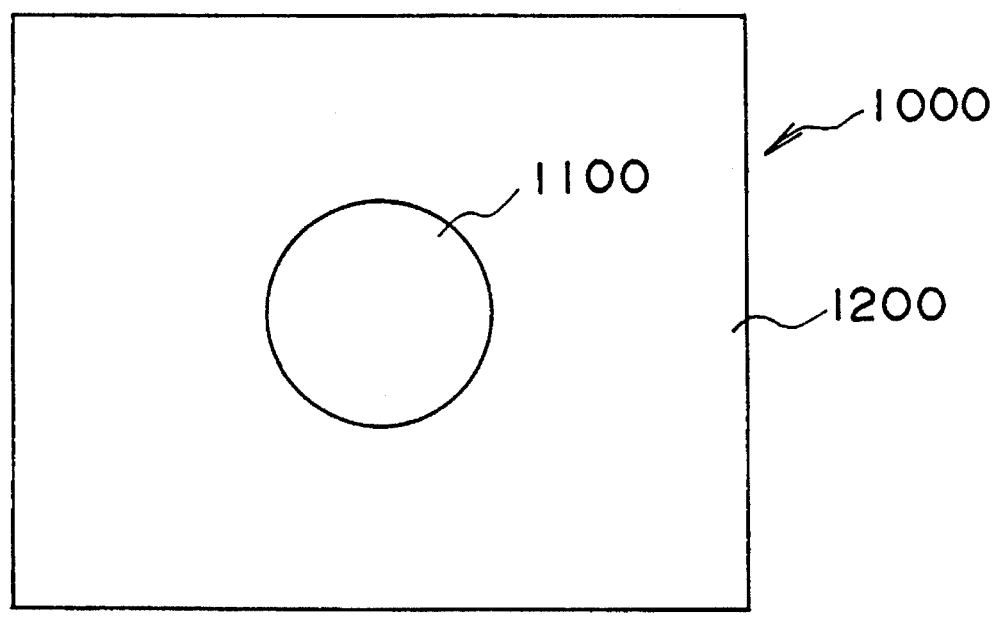
FIG. 17 is a diagram for explaining an example in which the detection sensitivity characteristics of photosensors are are different in different regions of an imaging face in accordance with an object to be measured.

By the way, in a case where a plurality of objects to be measured are existent and where the wavelengths of the emission light components thereof are different (for example, in a case where fuel of the hydrocarbon series is used for the inner burners 62 and where fuel containing no hydrocarbon is used for the outer burners 63), the photosensors may well be endowed with different detection sensitivity characteristics in accordance with the positions of the CCD section on the imaging face of the camera. In this embodiment, as illustrated in FIGS. 17, 18(a) and 18(b) by way of example, the detection sensitivity characteristics of the photosensors $S_{24}$~$S_{29}$ and those $S'_{24}$~$S'_{29}$ which are used for the spectrum analysis are made different between the central region 1100 of the imaging face 1000 for mainly projecting the inner burners 62 and in the peripheral region 1200 thereof for mainly projecting the outer burners 63. Needless to say, the detection sensitivity characteristics of the photosensors $S_{24}$~$S_{29}$ of the central region 1100 are suited to observe the light of the inner burners 62. On the other hand, the detection sensitivity characteristics of the photosensors $S'_{24}$~$S'_{29}$ of the peripheral region 1200 are suited to observe the light of the outer burners 63. The photosensors $S_{21}$~$S_{23}$ for obtaining the color picture, however, have the same characteristics as those of the conventional camera in both the central region 1100 and the peripheral region 1200. Thus, a more precise spectrum analysis is realized in spite of the use of a CCD (charge-coupled device) which includes a small number of photosensors. Besides, since the CCD having the small number of photosensors is usually inexpensive, the cost of the apparatus can be curtailed further.

Meanwhile, it is possible to apply the spectrum analysis camera of the present invention to, for example, a process management in a plasma chemical process. The "plasma chemical process" is a process in which a radical entailing light emission is used for a reaction so as to synthesize a substance, and in which the distributed state of the light emitting radical greatly affects the quality of the finished product. It is accordingly necessary to control the internal pressure of a process chamber, the feed rates of starting materials, etc., while the distributed state of the radical is being normally monitored. In the prior art, however, the intensity distribution of the radical light emission is seldom monitored, and the finished product is merely inspected in most cases. Therefore, finished products are rejected at a high rate in the prior art. The reason why the monitoring of the intensity distribution of the radical light emission is rarely done in the prior art, is that an apparatus for the monitoring becomes complicated when the conventional camera is used. More specifically with the conventional camera, a filter adapted to pass only the light of a specified wavelength region must be arranged in front of a lens. Further, in a case where two or more types of radicals are to be monitored or where the ordinary color picture is also to be obtained, it is indispensable to mount a mechanical driver for the changing between the filters or to employ a plurality of cameras. With the construction in which the drive mechanism or the like is mounted, failures are highly liable to take place, and the use of the apparatus becomes troublesome. On the other hand, with the construction in which the plurality of cameras are employed, these cameras must image an identical light emission part at all times, but this is very difficult. Incidentally, the "conventional camera" referred to here signifies the camera whose detection wavelength ranges of R, G and B overlap one another and cover the whole visible radiation region as illustrated in FIG. 3(c). The spectrum analysis camera of the present invention and the spectrum analysis system employing it do not have such problems. Accordingly, the intensity distributions of the radical light emissions can be normally monitored, and the quality of the product can be enhanced.

Although each of the embodiments of the combustion system has been described as including separate monitors for the color picture and for the spectrum analysis, a single television monitor may well be used. Even in this case, both the functions can be switched merely by altering the contents of signal processing within the apparatus (or the choices of signals to be delivered to the monitor), and hence, failures are hardly liable to occur. In addition, the system is easy to use.

Although each of the embodiments has been described on the premise of the camera employing a CCD, it is not restricted to the CCD camera. Needless to say, the present invention is also applicable to any other camera which detects light on the basis of another principle or another method, as long as the camera can be endowed with different detection wavelength ranges at the respective parts (respective pixels) of the imaging face thereof.

The present invention is especially effective as stated below.

In a spectrum analysis system according to the present invention, both the creation of a color picture close to a color image which would be perceived by a human and a spectrum analysis based on the extraction of only the light of one or more specified wavelengths can be performed using a single camera. This is advantageous in point of cost. Moreover, since filters, etc., mounted outside a camera are not used for separating the light components of the respective wavelengths, the spectrum analysis system undergoes infrequent failures and can be used similarly to a system employing the conventional camera(s).

When the spectrum analysis system of the present invention is applied to, for example, a combustion evaluation apparatus, both the creation of the color picture and the observation of flames based on air ratios can be performed.

The combustion properties of the flames can be evaluated in spatial relations in a short time through only the simple optical adjustments of focusing. Accordingly, the flames can be correctly diagnosed, and the accuracy of a combustion control can be enhanced. Further, a combustion system which is favorable for the protection of the environment and which has a high combustion efficiency can be provided by applying the apparatus or method.

What is claimed is:

1. A camera comprising a plurality of photosensors which are disposed on an imaging face thereof, and which separately deliver photodetection signals of each of said photosensors;

at least two of said plurality of photosensors in a predetermined combination being set as one photosensitive unit on a condition that the photosensors included in said one photosensitive unit have detection wavelength ranges which do not overlap each other.

2. A camera as defined in claim 1, wherein said photosensors constituting said one photosensitive unit are arranged in adjacency to each other on said imaging face.

3. A camera as defined in claim 1, wherein a comprehensive detection wavelength range of all said photosensors constituting said one photosensitive unit covers the whole visible radiation range.

4. A camera for observing light of certain specified wavelength as defined in claim 1, wherein a photosensor which has a maximum detectivity at and near a specified wavelength is included in each of the photosensitive units.

5. A camera as defined in claim 4, wherein at least one member selected from the group consisting of emission wavelengths of a CH radical, a $C_2$ radical and an OH radical is contained as said specified wavelength.

6. A spectrum analysis system, comprising:

the camera defined in claim 1; and separation means for separating only the signals of the desired photosensors from an output signal of said camera.

7. A spectrum analysis system, comprising:

the camera defined in claim 1; and synthesis means for synthesizing R (red), G (green) and B (blue) signals by using an output signal from said camera.

8. A camera comprising a plurality of photosensors which are disposed on an imaging face thereof, and which separately deliver photodetection signals of each of the photosensors;

said photosensors including at least one member selected from the group consisting of:

a first photosensor whose detection wavelength range contains an emission wavelength of a CH radical, but does not contain emission wavelengths of either a $C_2$ radical or an OH radical;

a second photosensor whose detection wavelength range contains the emission wavelength of the $C_2$ radical, but does not contain the emission wavelengths of either the CH radical and the OH radical; and a third photosensor whose detection wavelength range contains the emission wavelength of the OH radical, but does not contain the emission wavelengths of either the CH radical and the $C_2$ radical.

9. A camera comprising a plurality of photosensors which are disposed on an imaging face thereof, and which separately deliver photodetection signals of each of said photosensors;

at least two adjacent ones of said plurality of photosensors being set as one photosensitive unit;

said one photosensitive unit including at least two members selected from the group consisting of:

a first photosensor whose detection wavelength range contains an emission wavelength of a CH radical, but does not contain emission wavelengths of either a $C_2$ radical and an OH radical;

a second photosensor whose detection wavelength range contains the emission wavelength of the $C_2$ radical, but does not contain the emission wavelengths of either the CH radical and the OH radical; and a third photosensor whose detection wavelength range contains the emission wavelength of the OH radical, but does not contain the emission wavelengths of either the CH radical and the $C_2$ radical.

10. A spectrum analysis system, comprising:

the camera defined in claim 8; and separation means for separating only the signals of the desired photosensors from an output signal of said camera.

11. A spectrum analysis system, comprising:

the camera defined in claim 8; and synthesis means for synthesizing R (red), G (green) and B (blue) signals by using an output signal from said camera.

12. A camera comprising a plurality of photosensors, photodetection signals of which are separately delivered;

a plurality of adjacent ones of said plurality of photosensors being set as one photosensitive unit;

said one photosensitive unit including:

photosensors for a picture which exhibit sensitivity curves agreeing with those of cameras for ordinary television; and photosensors for a spectrum analysis whose detection wavelength ranges do not overlap one another.

13. A spectrum analysis system, comprising:

the camera defined in claim 12; and separation means for separating only the signals of the desired photosensors among the output signals derived from said photosensors for said spectrum analysis.

14. A combustion evaluation apparatus for evaluating a combustion state of flames, comprising:

a camera which photographs the flames, the camera including a plurality of photosensors having respective detection wavelength ranges which do not overlap one another;

display means for displaying a picture of the flames by using an output signal from said camera; and arithmetic means for obtaining a physical quantity for evaluating a combustion property of said flames, by the use of the output signal of said camera.

15. A combustion evaluation apparatus as defined in claim 14, wherein said camera is the camera defined in any one of claims 5, 8 or 9.

16. A combustion system, comprising:

a burner which burns a mixture consisting of fuel and air;

feed means for feeding the fuel and the air to said burner;

adjustment means for adjusting a feed rate of at least one of said fuel and said air which are to be fed to said burner;

a camera which photographs flames, the camera including a plurality of photosensors having respective detection wavelength ranges which do not overlap one another;

display means for displaying a picture of the flames by using an output signal from said camera;

arithmetic means for obtaining a physical quantity for evaluating a combustion property of the flames, by using the output signal from said camera; and control means for controlling said adjustment means in accordance with the physical quantity obtained by said arithmetic means.

17. A combustion system as defined in claim 16, wherein said camera is the camera defined in any one of claims 5, 8 or 9.

18. An apparatus comprising:

a plurality of photosensors disposed on an imaging surface, the photosensors separately outputting respective photodetection signals;

wherein the photosensors are grouped into a plurality of photosensitive units, each of the photosensitive units including at least two of the photosensors, the photosensors of each of the photosensitive units having respective detection wavelength ranges which do not overlap one another.

19. An apparatus according to claim 18, wherein in each of the photosensitive units, each of the photosensors of the photosensitive unit is adjacent to at least one other photosensor of the photosensitive unit.

20. An apparatus according to claim 18, wherein the detection wavelength ranges of the photosensors in each of the photosensitive units form a composite detection wavelength range covering the entire visible radiation wavelength range.

21. An apparatus according to claim 18, wherein one photosensor of each of the photosensitive units has a maximum detection sensitivity at a specified wavelength.

22. An apparatus according to claim 21, wherein the one photosensor has a maximum detection sensitivity at an emission wavelength of one of a CH radical, a $C_2$ radical, and an OH radical.

23. An apparatus according to claim 18, further comprising means for receiving the photodetection signals outputted from all of the photosensors of each of the photosensitive units and outputting only the photodetection signals outputted from selected ones of the photosensors of each of the photosensitive units.

24. An apparatus according to claim 18, further comprising means for synthesizing R (red), G (green), and B (blue) signals from the photodetection signals outputted from the photosensors of each of the photosensitive units.

25. An apparatus comprising:

a plurality of photosensors disposed on an imaging surface, the photosensors separately outputting respective photodetection signals;

wherein the photosensors include at least one of a first type of photosensor having a detection wavelength range which includes an emission wavelength of a CH radical, but does not include an emission wavelength of a $C_2$ radical and an emission wavelength of an OH radical, a second type of photosensor having a detection wavelength range which includes the emission wavelength of the $C_2$ radical, but does not include the emission wavelength of the CH radical and the emission wavelength of the OH radical, and a third type of photosensor having a detection wavelength range which includes the emission wavelength of the OH radical, but does not include the emission wavelength of the CH radical and the emission wavelength of the $C_2$ radical.

26. An apparatus according to claim 25, further comprising means for receiving the photodetection signals outputted from all of the photosensors of each of the photosensitive units and outputting only the photodetection signals outputted from selected ones of the photosensors of each of the photosensitive units.

27. An apparatus according to claim 25, further comprising means for synthesizing R (red), G (green), and B (blue) signals from the photodetection signals outputted from the photosensors of each of the photosensitive units.

28. An apparatus comprising:

a plurality of photosensors disposed on an imaging surface, the photosensors separately outputting respective photodetection signals;

wherein the photosensors are grouped into a plurality of photosensitive units, each of the photosensitive units including at least two of the photosensors;

wherein in each of the photosensitive units, each of the photosensors of the photosensitive unit is adjacent to at least one other photosensor of the photosensitive unit; and wherein the photosensors of each of the photosensitive units include at least one of a first type of photosensor having a detection wavelength range which includes an emission wavelength of a CH radical, but does not include an emission wavelength of a $C_2$ radical and an emission wavelength of an OH radical, a second type of photosensor having a detection wavelength range which includes the emission wavelength of the $C_2$ radical, but does not include the emission wavelength of the CH radical and the emission wavelength of the OH radical, and a third type of photosensor having a detection wavelength range which includes the emission wavelength of the OH radical, but does not include the emission wavelength of the CH radical and the emission wavelength of the $C_2$ radical.

29. An apparatus comprising:

a plurality of photosensors disposed on an imaging surface, the photosensors separately outputting respective photodetection signals;

wherein the photosensors are grouped into a plurality of photosensitive units, each of the photosensitive units including at least two of the photosensors;

wherein in each of the photosensitive units, each of the photosensors of the photosensitive unit is adjacent to at least one other photosensor of the photosensitive unit; and wherein the photosensors of each of the photosensitive units include photosensors, having respective detection sensitivity curves substantially corresponding to detection sensitivity curves of an ordinary color television camera, for outputting respective photodetection signals for use in displaying an ordinary color image, and photosensors, having respective detection wavelength ranges which do not overlap one another, for outputting respective photodetection signals for use in performing spectrum analysis.

30. An apparatus according to claim 29, further comprising means for receiving the photodetection signals outputted from all of the photosensors of each of the photosensitive units and outputting only the photodetection signals for use in performing spectrum analysis outputted from the photosensors having respective detection wavelength ranges which do not overlap one another.

31. A combustion evaluation apparatus for evaluating a combustion state of flames, comprising:

a camera for imaging the flames and producing an output signal representative of light from the flames, the camera including photosensors having respective detection wavelength ranges which do not overlap one another;

display means for displaying an image of the flames based on the output signal of the camera; and calculating means for calculating a physical quantity indicative of a combustion property of the flames based on the output signal of the camera.

32. A combustion evaluation apparatus according to claim 31, wherein the photosensors are disposed on an imaging surface of the camera and separately output respective photodetection signals collectively constituting the output signal of the camera;

wherein the photosensors are grouped into a plurality of photosensitive units, each of the photosensitive units including at least two of the photosensors, the photosensors of each of the photosensitive units having respective detection wavelength ranges which do not overlap one another; and wherein one photosensor of each of the photosensitive units has a maximum detection sensitivity at an emission wavelength of one of a CH radical, a $C_2$ radical, and an OH radical.

33. A combustion evaluation apparatus according to claim 31, wherein the photosensors are disposed on an imaging surface of the camera and separately output respective photodetection signals collectively constituting the output signal of the camera; and wherein the photosensors include at least one of a first type of photosensor having a detection wavelength range which includes an emission wavelength of a CH radical, but does not include an emission wavelength of a $C_2$ radical and an emission wavelength of an OH radical, a second type of photosensor having a detection wavelength range which includes the emission wavelength of the $C_2$ radical, but does not include the emission wavelength of the CH radical and the emission wavelength of the OH radical, and a third type of photosensor having a detection wavelength range which includes the emission wavelength of the OH radical, but does not include the emission wavelength of the CH radical and the emission wavelength of the $C_2$ radical.

34. A combustion evaluation apparatus according to claim 31, wherein the photosensors are disposed on an imaging surface of the camera and separately output respective photodetection signals collectively constituting the output signal of the camera;

wherein the photosensors are grouped into a plurality of photosensitive units, each of the photosensitive units including at least two of the photosensors;

wherein in each of the photosensitive units, each of the photosensors of the photosensitive unit is adjacent to at least one other photosensor of the photosensitive unit; and wherein the photosensors of each of the photosensitive units include at least one of a first type of photosensor having a detection wavelength range which includes an emission wavelength of a CH radical, but does not include an emission wavelength of a $C_2$ radical and an emission wavelength of an OH radical, a second type of photosensor having a detection wavelength range which includes the emission wavelength of the $C_2$ radical, but does not include the emission wavelength of the CH radical and the emission wavelength of the OH radical, and a third type of photosensor having a detection wavelength range which includes the emission wavelength of the OH radical, but does not include the emission wavelength of the CH radical and the emission wavelength of the $C_2$ radical.

35. A combustion system comprising:

a burner for burning a mixture of fuel and air to produce flames;

fuel feeding means for feeding the fuel to the burner at a fuel feed rate;

air feeding means for feeding the air to the burner at an air feed rate;

feed rate adjusting means for controlling at least one of the fuel feeding means and the air feeding means to adjust at least one of the fuel feed rate and the air feed rate;

a camera for imaging the flames and producing an output signal representative of light from the flames, the camera including photosensors having respective detection wavelength ranges which do not overlap one another;

display means for displaying an image of the flames based on the output signal of the camera;

calculating means for calculating a physical quantity indicative of a combustion property of the flames based on the output signal of the camera; and control means for controlling the feed rate adjusting means based on the physical quantity calculated by the calculating means.

36. A combustion system according to claim 35, wherein the photosensors are disposed on an imaging surface of the camera and separately output respective photodetection signals collectively constituting the output signal of the camera;

wherein the photosensors are grouped into a plurality of photosensitive units, each of the photosensitive units including at least two of the photosensors, the photosensors of each of the photosensitive units having respective detection wavelength ranges which do not overlap one another; and wherein one photosensor of each of the photosensitive units has a maximum detection sensitivity at an emission wavelength of one of a CH radical, a $C_2$ radical, and an OH radical.

37. A combustion system according to claim 35, wherein the photosensors are disposed on an imaging surface of the camera and separately output respective photodetection signals collectively constituting the output signal of the camera; and wherein the photosensors include at least one of a first type of photosensor having a detection wavelength range which includes an emission wavelength of a CH radical, but does not include an emission wavelength of a $C_2$ radical and an emission wavelength of an OH radical, a second type of photosensor having a detection wavelength range which includes the emission wavelength of the $C_2$ radical, but does not include the emission wavelength of the CH radical and the emission wavelength of the OH radical, and a third type of photosensor having a detection wavelength range which includes the emission wavelength of the OH radical, but does not include the emission wavelength of the CH radical and the emission wavelength of the $C_2$ radical.

38. A combustion system according to claim 35, wherein the photosensors are disposed on an imaging surface of the camera and separately output respective photodetection signals collectively constituting the output signal of the camera;

wherein the photosensors are grouped into a plurality of photosensitive units, each of the photosensitive units including at least two of the photosensors;

wherein in each of the photosensitive units, each of the photosensors of the photosensitive unit is adjacent to at least one other photosensor of the photosensitive unit; and wherein the photosensors of each of the photosensitive units include at least one of a first type of photosensor having a detection wavelength range which includes an emission wavelength of a CH radical, but does not include an emission wavelength of a $C_2$ radical and an emission wavelength of an OH radical, a second type of photosensor having a detection wavelength range which includes the emission wavelength of the $C_2$ radical, but does not include the emission wavelength of the CH radical and the emission wavelength of the OH radical, and a third type of photosensor having a detection wavelength range which includes the emission wavelength of the OH radical, but does not include the emission wavelength of the CH radical and the emission wavelength of the $C_2$ radical.

* * * * *